(12) United States Patent
Yamagishi

(10) Patent No.: US 10,979,495 B2
(45) Date of Patent: Apr. 13, 2021

(54) INFORMATION PROCESSING APPARATUS, INFORMATION PROCESSING METHOD, AND INFORMATION PROCESSING SYSTEM

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 6 days.

(21) Appl. No.: 16/319,524

(22) PCT Filed: Aug. 15, 2017

(86) PCT No.: PCT/JP2017/029340
§ 371 (c)(1),
(2) Date: Jan. 22, 2019

(87) PCT Pub. No.: WO2018/043111
PCT Pub. Date: Mar. 8, 2018

(65) Prior Publication Data
US 2020/0244725 A1 Jul. 30, 2020

(30) Foreign Application Priority Data

Aug. 29, 2016 (JP) .............................. JP2016-166782

(51) Int. Cl.
*H04L 29/08* (2006.01)
*G06F 16/21* (2019.01)
(Continued)

(52) U.S. Cl.
CPC .......... *H04L 67/1031* (2013.01); *G06F 13/00* (2013.01); *G06F 16/211* (2019.01);
(Continued)

(58) Field of Classification Search
CPC ........ G06F 13/00; G06F 13/20; G06F 13/211; G06F 16/211; H04L 47/12; H04L 47/24;
(Continued)

(56) References Cited

U.S. PATENT DOCUMENTS 8,635,440 B2 * 1/2014 Statia .................. H04L 63/0281
713/153
2007/0061282 A1 3/2007 Ganguly et al.
(Continued)

FOREIGN PATENT DOCUMENTS

JP 2014-112768 A 6/2014
JP 2015-49650 A 3/2015
(Continued)

OTHER PUBLICATIONS

International Search Report dated Oct. 10, 2017 in PCT/JP2017/029340 filed on Aug. 15, 2017.
(Continued)

*Primary Examiner* — Thomas J Dailey
(74) *Attorney, Agent, or Firm* — Oblon, McClelland, Maier & Neustadt, L.L.P.

(57) ABSTRACT

The present technology relates to an information processing apparatus, an information processing method, and an information processing system capable of achieving appropriate load balancing in a case where a plurality of proxies is installed.

The information processing apparatus functions as a proxy that receives a content stream distributed for each of a plurality of services and transmits the content stream to a client device connected to a network, the proxy being configured to function as a master proxy for a slave proxy, and determines a service coverage range corresponding to a predetermined policy, for each of the proxies, making it possible to achieve appropriate load balancing in a case (Continued)

where a plurality of proxies is installed. The present technology can be applied to, for example, an FW proxy device connected to the network such as a home LAN, a head end of a cable operator, and a base station of a mobile network.

17 Claims, 28 Drawing Sheets

(51) Int. Cl.
| | | |
|---|---|---|
| H04L 29/06 | (2006.01) | |
| G06F 13/00 | (2006.01) | |
| H04L 12/803 | (2013.01) | |
| H04M 3/00 | (2006.01) | |
| G06F 13/20 | (2006.01) | |
| H04L 12/851 | (2013.01) | |

(52) U.S. Cl.
CPC ........ *H04L 47/125* (2013.01); *H04L 65/4076* (2013.01); *H04L 67/1004* (2013.01); *H04L 67/1014* (2013.01); *H04L 67/2814* (2013.01); *H04M 3/00* (2013.01); *G06F 13/20* (2013.01); *H04L 47/24* (2013.01); *H04L 47/2408* (2013.01)

(58) Field of Classification Search
CPC .............. H04L 47/2408; H04L 65/4076; H04L 67/1004; H04L 67/1014; H04L 67/1031; H04L 67/2814; H04M 3/00
See application file for complete search history.

(56) References Cited

U.S. PATENT DOCUMENTS

| | | | |
|---|---|---|---|
| 2010/0302986 A1* | 12/2010 | Kim | H04W 76/40 370/312 |
| 2012/0072946 A1* | 3/2012 | Cranman | H04N 21/4312 725/28 |
| 2014/0199044 A1 | 7/2014 | Gupta et al. | |
| 2014/0201323 A1 | 7/2014 | Fall et al. | |
| 2014/0337411 A1* | 11/2014 | Panje | H04N 21/8456 709/203 |
| 2014/0372624 A1 | 12/2014 | Wang et al. | |
| 2015/0347246 A1 | 12/2015 | Matsui et al. | |
| 2016/0371153 A1* | 12/2016 | Dornemann | G06F 11/1461 |
| 2017/0230434 A1 | 8/2017 | Wang et al. | |
| 2018/0026733 A1* | 1/2018 | Yang | H04L 65/608 725/33 |

FOREIGN PATENT DOCUMENTS

| | | |
|---|---|---|
| WO | WO 2007/032549 A1 | 3/2007 |
| WO | WO 2016/067989 A1 | 5/2016 |

OTHER PUBLICATIONS

Extended European Search Report dated Jun. 28, 2019 in corresponding European Patent Application No. 17846119.0 citing documents AA and AC therein, 9 pages.

* cited by examiner

FIG. 10

```
<root xmlns=" urn:schemas-upnp-org:device-1-0" >
:
<serviceList>
<service>
<serviceType>urn:atsc:proxy</serviceType>
<serviceId>urn:UPnP:serviceId:1234</serviceId>
<SCPDURL></SCPDURL>
<controlURL>http://192.168.1.1:23456/getATSC3.0ProxyAddressPort</controlURL>
:
</service>
<service>
<serviceType>urn:atsc:configMan</serviceType>
<serviceId>urn:UPnP:serviceId:5678</serviceId>
<SCPDURL></SCPDURL>
<controlURL>http://192.168.1.1:23456/getServiceScope</controlURL>
:
</service>
</serviceList>
:
</root>
```

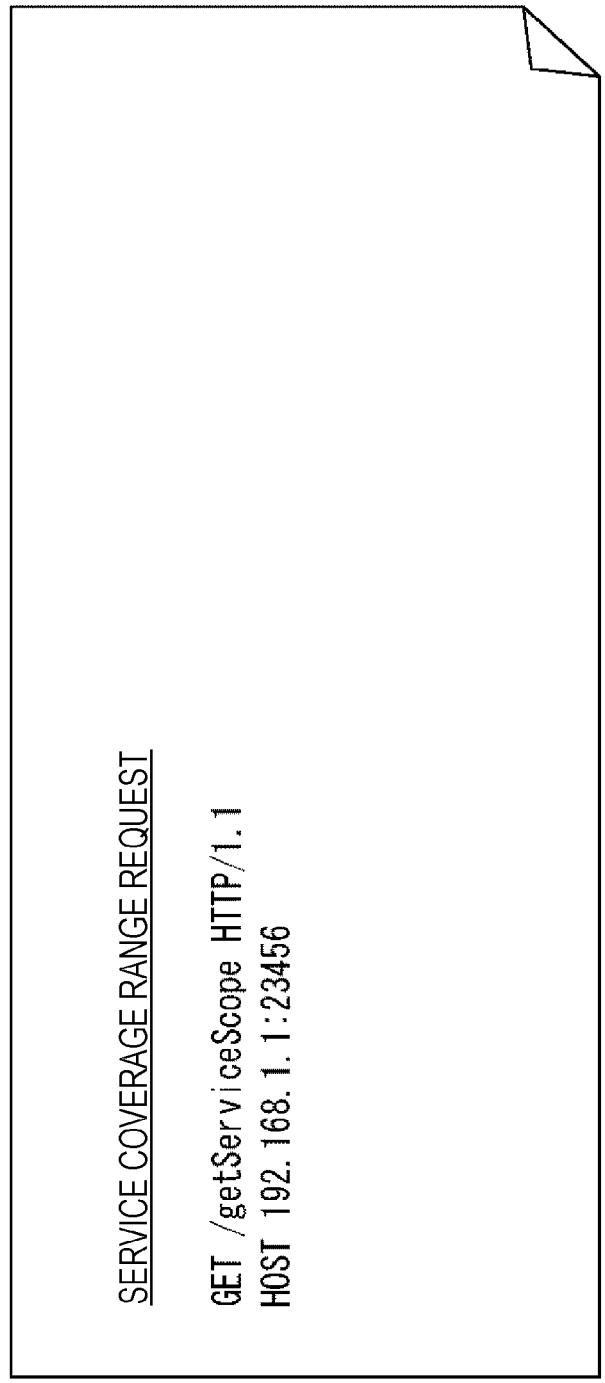

FIG. 19

PROXY LISTENING ADDRESS/PORT REQUEST

GET /getATSC3.0ProxyAddressPort HTTP/1.1
HOST 192.168.1.1:23456
...

FIG. 20

PROXY LISTENING ADDRESS/PORT RESPONSE

HTTP/1.1 200 OK
Content-Type: application/text; charset=utf-8
...
192.168.1.1:34567

INFORMATION PROCESSING APPARATUS, INFORMATION PROCESSING METHOD, AND INFORMATION PROCESSING SYSTEM

TECHNICAL FIELD

The present technology relates to an information processing apparatus, an information processing method, and an information processing system, and particularly relates to an information processing apparatus, an information processing method, and an information processing system capable of achieving appropriate load balancing in a case where a plurality of proxies is installed.

BACKGROUND ART

There is a proposed technology of installing a proxy server (proxy) between a server that distributes content via the Internet and a client device that reproduces the content so as to enhance responsiveness to a request from the client device (refer to Patent Document 1, for example).

CITATION LIST

Patent Document

Patent Document 1: Japanese Patent Application Laid-Open No. 2015-49650

SUMMARY OF THE INVENTION

Problems to be Solved by the Invention

Meanwhile, there has been a request for a technique capable of appropriately balancing the load of each of proxies in a case where a plurality of proxies is installed in a network to which the client device is connected. At a present point, however, a technical method capable of satisfying this request has not been established.

The present technology has been made in view of such a situation, and aims to enable appropriate load balancing to be performed in a case where a plurality of proxies is installed.

Solutions to Problems

An information processing apparatus according to a first aspect of the present technology is an information processing apparatus that functions as a proxy that receives a content stream distributed for each of a plurality of services and transmits the content stream to a client device connected to a network, the proxy being configured to function as a master proxy for a slave proxy, the information processing apparatus including a processing unit that determines a service coverage range corresponding to a predetermined policy, for each of the proxies.

The information processing apparatus according to the first aspect of the present technology may be an independent apparatus or may be an internal block configuring one apparatus. Furthermore, an information processing method according to the first aspect of the present technology is an information processing method corresponding to the information processing apparatus according to the first aspect of the present technology described above.

In the information processing apparatus and the information processing method according to the first aspect of the present technology, the apparatus functions as a proxy that receives a content stream distributed for each of a plurality of services and transmits the content stream to a client device connected to a network, the proxy being configured to function as a master proxy for a slave proxy, and a service coverage range corresponding to a predetermined policy is determined for each of proxies.

An information processing system according to a second aspect of the present technology is an information processing system in which a first information processing apparatus on which a master proxy operates, one or more second information processing apparatuses on which a slave proxy operates, and one or more client devices, are mutually connected via a network, in which the first information processing apparatus functions as a proxy that receives a content stream distributed for each of a plurality of services and transmits the content stream to the client device connected to the network, the proxy being configured to function as a master proxy for the slave proxy, the first information processing apparatus including a processing unit that determines a service coverage range corresponding to a predetermined policy, for each of the proxies, and the second information processing apparatus functions as a proxy that receives a content stream distributed for each of a plurality of services and transmits the content stream to the client device connected to the network, the proxy being configured to function as the slave proxy with respect to the master proxy, the second information processing apparatus including a processing unit that processes the content stream distributed by the service corresponding to the coverage range determined by the master proxy.

In the information processing system according to the second aspect of the present technology, that is, in the information processing system in which the first information processing apparatus on which the master proxy operates, one or more second information processing apparatuses on which the slave proxy operates, and one or more client devices, are mutually connected via a network, the first information processing apparatus functions as a proxy that receives a content stream distributed for each of a plurality of services and transmits the content stream to the client device connected to the network, the proxy being configured to function as a master proxy for the slave proxy, and the service coverage range corresponding to a predetermined policy is determined for each of the proxies, and the apparatus functions as a proxy that receives a content stream distributed for each of a plurality of services and transmits the content stream to the client device connected to the network, the proxy being configured to function as the slave proxy with respect to the master proxy, and the content stream distributed by the service corresponding to the coverage range determined by the master proxy is processed.

Effects of the Invention

According to the first and second aspects of the present technology, it is possible to appropriately achieve load balancing in a case where a plurality of proxies is installed.

Note that effects described herein are non-restricting. The effects may be any of effects described in the present disclosure.

BRIEF DESCRIPTION OF DRAWINGS

FIG. 10 is a diagram illustrating an example of a device description response.

FIG. 11 is a diagram illustrating an example of a service coverage range request.

FIG. 19 is a diagram illustrating an example of a proxy listening address/port request.

FIG. 20 is a diagram illustrating an example of a proxy listening address/port response.

FIG. 25 is a diagram illustrating an example of a topology in a case where the network is a home LAN or the like.

MODE FOR CARRYING OUT THE INVENTION

Figure 1:
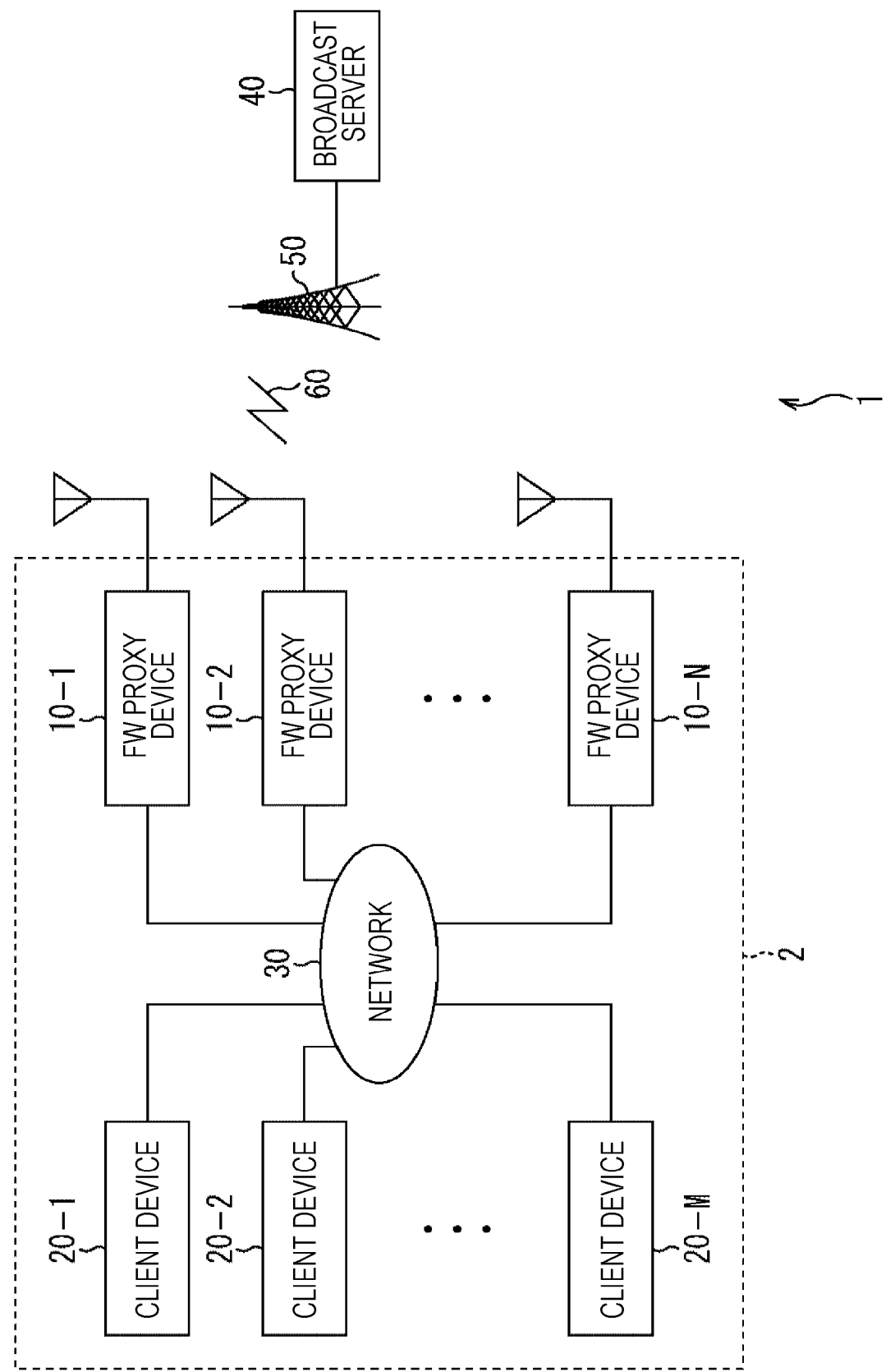
FIG. 1 is a diagram illustrating a configuration a transmission system according to an embodiment of the present technology.

Hereinafter, embodiments of the present technology will be described with reference to the drawings. Note that the description will be given in the following order.

1. System configuration
2. Outline of the present technology
3. Load balancing on FW proxy device in accordance with a relationship between master proxy and slave proxy
 (1) Example in a case where new slave proxy device is added
 (2) Example in the case where new slave proxy device is further added
 (3) Example of discovery and connection of master proxy by client device
4. Implementation example of master proxy and slave proxy
 (1) Example of automatic assignment of service coverage range
 (2) Example of assignment of coverage range according to access frequency of service
 (3) Example of assignment of coverage range for each of BS according to access frequency of service
 (4) Example of topology of master proxy and slave proxy
5. Modification
6. Computer configuration 1. System Configuration (Exemplary Configuration of Transmission System)

FIG. 1 is a diagram illustrating a configuration a transmission system according to an embodiment of the present technology. Note that the term "system" represents a logical set of a plurality of apparatuses.

In FIG. 1, a transmission system 1 includes FW proxy devices 10-1 to 10-N (N: an integer of 1 or more), client devices 20-1 to 20-M (M: an integer of 1 or more), and a broadcast server 40.

In the transmission system 1, the FW proxy devices 10-1 to 10-N and the client devices 20-1 to 20-M are mutually connected via a network 30 such as a home local area network (LAN) built in an end user's home 2 so as to be able to communicate with each other.

The FW proxy device 10-1 is installed between a device connected to the network 30 and a broadcast transmission line 60 including the broadcast server 40, the transmission station 50, and the like, and has a function as a forward proxy (gateway function). The FW proxy device 10-1 includes a dedicated server for providing a forward proxy function, a television receiver, a set top box (STB), a network storage, or the like.

The FW proxy device 10-1 receives a broadcast wave transmitted from the broadcast server 40 via the transmission station 50, and transmits (transfers) a content stream obtained from the broadcast wave to any of the client devices 20-1 to 20-M connected to the network 30.

Similarly to the FW proxy device 10-1, each of the FW proxy devices 10-2 to 10-N includes a dedicated server, a television receiver, or the like, and has a function as a forward proxy. The FW proxy devices 10-2 to 10-N transmit (transfer) a content stream obtained from the broadcast waves from the broadcast server 40 to any of the client devices 20-1 to 20-M connected to the network 30.

As will be described in detail later, the FW proxy devices 10-1 to 10-N connected to the network 30 have a master-slave relationship such that one of the FW proxy devices 10 functions as a master proxy and the other FW proxy devices 10 function as slave proxies. In addition, since the FW proxy devices 10-1 to 10-N have the master-slave relationship, the FW proxy device 10 on which a master proxy operates assigns a service coverage range to each of the FW proxy devices 10.

Note that each of the FW proxy devices 10-1 to 10-N will be simply referred to as the FW proxy device 10 unless it is particularly necessary to distinguish between them.

Furthermore, in the following description, the FW proxy device 10 having a function as a master proxy is referred to as a master proxy device 10M, while the FW proxy device 10 having a function as a slave proxy is referred to as a slave proxy device 10S for mutual distinction.

Note that a detailed configuration of the master proxy device 10M will be described later with reference to FIG. 2. Additionally, a detailed configuration of the slave proxy device 10S will be described later with reference to FIG. 3. Furthermore, in the following description, the master proxy device 10M and the slave proxy device 10S will be referred to as the FW proxy device 10 unless it is particularly necessary to distinguish between them. That is, the FW proxy device 10 is either the master proxy device 10M or the slave proxy device 10S.

The client device 20-1 is a receiver that receives and reproduces a content stream transmitted (transferred) from any of the FW proxy devices 10-1 to 10-N via the network 30. That is, the client device 20-1 can reproduce the content distributed via broadcasting via any of the FW proxy devices 10-1 to 10-N in accordance with the operation of the end user, or the like.

The client device 20-1 is configured as a fixed receiver such as a television receiver, a set top box, and a personal computer, or a mobile receiver such as a smartphone, a mobile phone, and a tablet computer. Furthermore, the client device 20-1 may be a wearable computer such as a head-mounted display (HMD).

Similarly to the client device 20-1, each of the client devices 20-2 to 20-M is constituted by a fixed receiver used in a home, a mobile receiver, or the like, and receives and reproduces a content stream distributed via broadcasting via any of the FW proxy devices 10-1 to 10-N.

Note that in the following description, the client devices 20-1 to 20-M are simply referred to as the client device 20 unless it is particularly necessary to distinguish them. Furthermore, a detailed configuration of the client device 20 will be described later with reference to FIG. 4.

The broadcast server 40 is a server provided by a broadcast provider such as a broadcasting station, for example, and is connected to a transmission facility installed in the transmission station 50 via a predetermined line such as a dedicated line.

The broadcast server 40 processes files (data) and control information (signaling) of content such as programs and advertisements, and transmits the resulting data to a transmission facility in the transmission station 50 via a dedicated line. Subsequently, the transmission facility in the transmission station 50 applies necessary processing (modulation processing or the like) on the data from the broadcast server 40, so that the resulting broadcast wave is received by the FW proxy device 10 in the end user's home 2 via the broadcast transmission line 60.

Note that while the transmission system illustrated in FIG. 1 is an exemplary case where the FW proxy device 10 and the client device 20 are disposed in the end user's home 2, the location of the FW proxy device 10 is not limited to the end user's home 2 and may be installed at a head end of a cable operator, a base station of a mobile network, or the like, for example, so as to be able to cover regions in a wider range.

That is, for example, in a case where the FW proxy device 10 is installed in the head end of the cable operator, the client device 20 is to be installed in each of end user's residences contracted with the cable television service, rather than a same end user's home. Furthermore, for example, in a case where the FW proxy device 10 is installed in the base station of the mobile network, the client device 20 is a device possessed by the mobile service end user indoors or outdoors.

Furthermore, the FW proxy device 10 and the client device 20 may be in-vehicle devices mounted on vehicles such as automobiles. Moreover, the communication performed between devices and servers connected to the network 30 in the transmission system 1 of FIG. 1 is not limited to wireless communication or wired communication, but may also be mixed communication of wireless communication and wired communication, that is, wireless communication may be performed partially in one section while wired communication may be performed in other sections.

(Configuration of Master Proxy Device)

Figure 2:
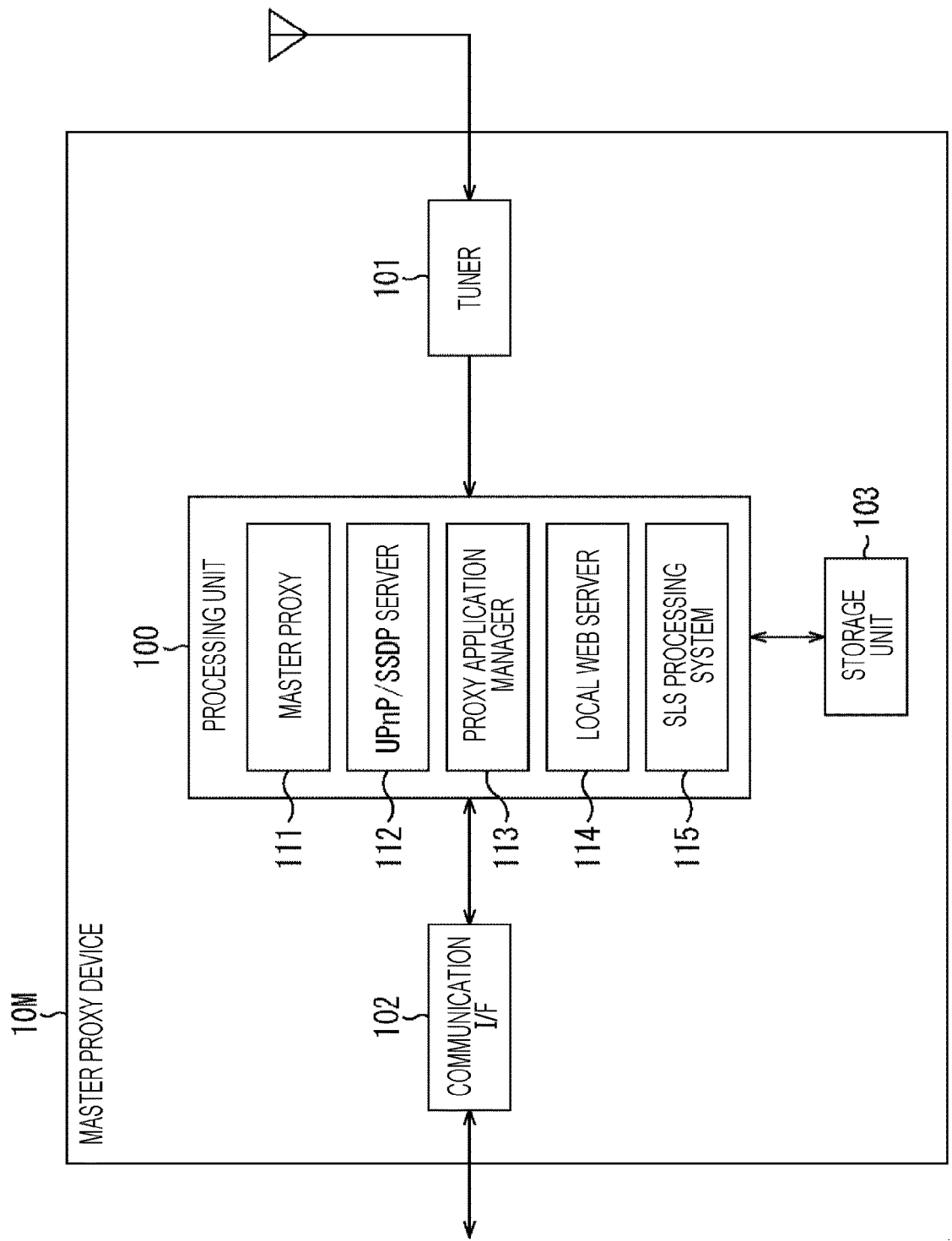
FIG. 2 is a diagram illustrating a configuration example of a master proxy device.

FIG. 2 is a diagram illustrating a configuration example of the master proxy device 10M in the FW proxy device 10 of FIG. 1.

In FIG. 2, the master proxy device 10M includes a processing unit 100, a tuner 101, a communication I/F 102, and a storage unit 103.

The processing unit 100 includes a central processing unit (CPU), a microprocessor, and the like, for example. The processing unit 100 performs processing such as various types of arithmetic processing and operation control of each of components.

The tuner 101 performs necessary processing (demodulation processing or the like) on the broadcast wave received via an antenna, and supplies a resulting multiplexed stream to the processing unit 100. The processing unit 100 processes the multiplexed stream supplied from the tuner 101 and supplies a resulting content stream to the communication I/F 102.

The communication I/F 102 includes, for example, a communication interface circuit or the like. The communication I/F 102 receives data transmitted from the client device 20 connected to the network 30, and supplies the data to the processing unit 100. Furthermore, the communication I/F 102 transmits the content stream supplied from the processing unit 100 to the client device 20 via the network 30.

The storage unit 103 includes, for example, a semiconductor memory, a hard disk drive (HDD), or the like. The storage unit 103 stores various data under the control of the processing unit 100.

The processing unit 100 includes a master proxy 111, a UPnP/SSDP server 112, a proxy application manager 113, a local web server 114, and an SLS processing system 115.

The master proxy 111 is a service operating on the master proxy device 10M and functions as a master proxy with respect to a slave proxy operating on the slave proxy device 10S.

The master proxy 111 performs processing of assigning a service coverage range to oneself (master proxy) and the slave proxy. The master proxy 111 performs processing related to the service in the coverage range in accordance with the service coverage range assigned by the master proxy 111 oneself.

Furthermore, the master proxy 111 notifies the slave proxy covering the target service of a request from the client device 20. Note that details of the processing performed by the master proxy 111 will be described later with reference to FIGS. 7 and 8, or the like.

The UPnP/SSDP server 112, the proxy application manager 113, and the local web server 114 are services that operate on the master proxy device 10M.

The UPnP/SSDP server 112, the proxy application manager 113, and the local web server 114 perform processing for establishing a master-slave relationship between the master proxy 111 and the slave proxy operating on the slave proxy device 10S connected to the network 30. Details of this processing will be described later with reference to FIGS. 9 and 16, or the like.

Furthermore, the UPnP/SSDP server 112, the proxy application manager 113, and the local web server 114 perform processing for establishing a connection between the master proxy 111 and the client device 20 connected to the network 30. Details of this processing will be described later with reference to FIG. 18 or the like.

The SLS processing system 115 performs processing related to service layer signaling (SLS) being control information obtained via broadcasting. As a result of processing the SLS by the SLS processing system 115, it is possible to obtain a desired content stream (content stream distributed in the service in a coverage range) from the multiplexed stream. Note that details of the SLS will be described later with reference to FIG. 5.

The master proxy device 10M is configured as described above.

(Configuration of Slave Proxy Device)

Figure 3:
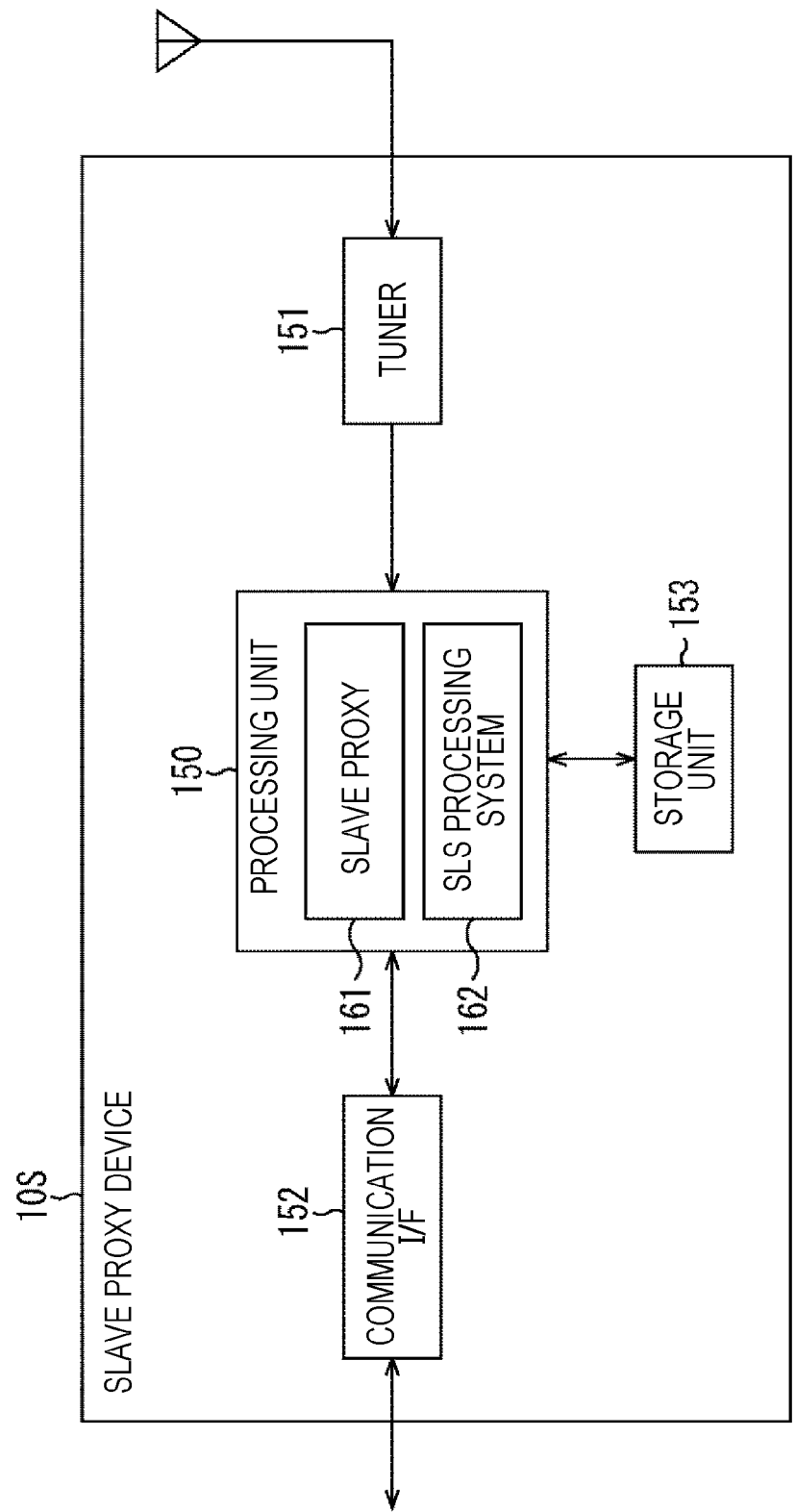
FIG. 3 is a diagram illustrating a configuration example of a slave proxy device.

FIG. 3 is a diagram illustrating a configuration example of the slave proxy device 10S in the FW proxy device 10 of FIG. 1.

In FIG. 3, the slave proxy device 10S includes a processing unit 150, a tuner 151, a communication I/F 152, and a storage unit 153. Note that the tuner 151 to the storage unit 153 are configured similarly to the tuner 101 to the storage unit 103 in FIG. 2, and thus descriptions thereof will be omitted here.

The processing unit 150 includes, for example, a CPU, a microprocessor, or the like. The processing unit 150 performs processing such as various types of arithmetic processing and operation control of each of components.

The processing unit 150 includes a slave proxy 161 and an SLS processing system 162.

The slave proxy 161 is a service operating on the slave proxy device 10S and functions as a slave proxy for the master proxy 111 operating on the master proxy device 10M.

The slave proxy 161 performs processing related to the service in the coverage range in accordance with the service coverage range assigned by the master proxy 111. Note that details of the processing performed by the slave proxy 161 will be described later with reference to FIGS. 7 and 8, or the like.

The SLS processing system 162 performs processing related to SLS being control information obtained via broadcasting. As a result of processing the SLS by the SLS processing system 162, it is possible to obtain a desired content stream (a content stream distributed by the service in a coverage range) from the multiplexed stream. Note that details of the SLS will be described later with reference to FIG. 5.

The slave proxy device 10S is configured as described above.

(Configuration of Client Device)

Figure 4:
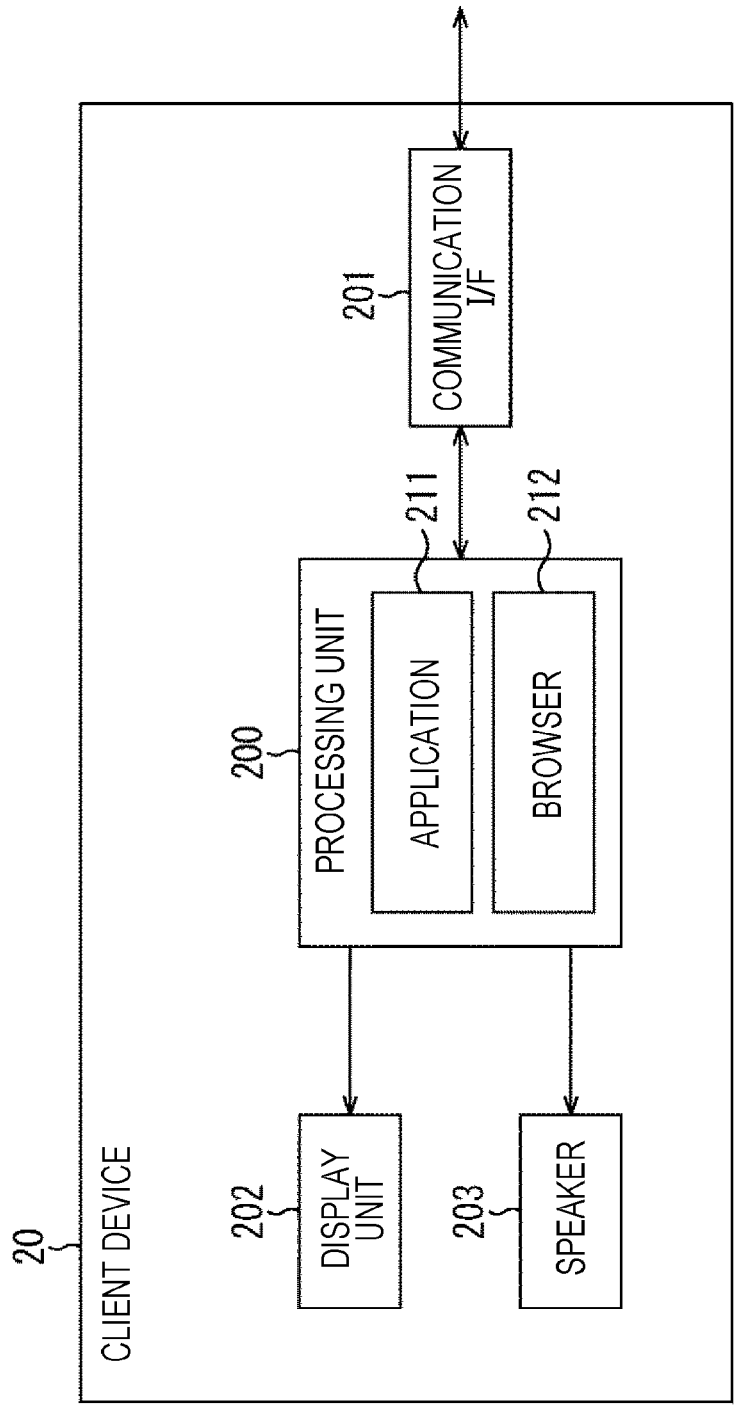
FIG. 4 is a diagram illustrating a configuration example of a client device.

FIG. 4 is a diagram illustrating a configuration example of the client device 20 in FIG. 1.

In FIG. 4, the client device 20 includes a processing unit 200, a communication I/F 201, a display unit 202, and a speaker 203.

The processing unit 200 includes, for example, a CPU, a microprocessor, or the like. The processing unit 200 performs processing such as various types of arithmetic processing and operation control of each of components.

The communication I/F 201 includes, for example, a communication interface circuit or the like.

In accordance with the control from the processing unit 200, the communication I/F 201 requests content to be distributed in a desired service to the master proxy device 10M connected to the network 30. Furthermore, the communication I/F 201 receives a content stream transmitted (transferred) from the master proxy device 10M or the slave proxy device 10S via the network 30, and supplies the received content stream to the processing unit 200.

The processing unit 200 processes the content stream supplied from the communication I/F 201, supplies video data among the resulting data to the display unit 202, and supplies the audio data to the speaker 203.

The display unit 202 includes a display such as a liquid crystal display (LCD) and an organic electroluminescence display (GELD), for example. The display unit 202 displays an image corresponding to the video data supplied from the processing unit 200. The speaker 203 outputs a sound corresponding to the audio data supplied from the processing unit 200.

Note that in a case where the display unit 202 has a function of a touch panel, an operation signal corresponding to the operation of the end user on the touch panel is supplied to the processing unit 200, and then, the processing unit 200 performs processing in accordance with the operation signal. Moreover, although not illustrated in FIG. 4, it is also allowable to provide an input unit such as a physical button so as to allow the operation signal corresponding to the operation of the end user onto the input unit to be supplied to the processing unit 200.

The processing unit 200 includes an application 211 and a browser 212. The application 211 and the browser 212 supply a renderer function.

The application 211 performs processing for allowing the client device 20 connected to the network 30 to establish a connection with the master proxy 111 operating on the master proxy device 10M. Note that details of processing performed by the application 211 will be described later with reference to FIG. 18 or the like.

The browser 212 processes the data, which is a content stream supplied from the communication I/F 201 and received via broadcasting by the master proxy device 10M or the slave proxy device 10S, and reproduces the content.

Note that the browser 212 has a function as a DASH player, details of which will be described later with reference to FIG. 5. Furthermore, details of the processing performed by the browser 212 will be described later with reference to FIGS. 8, 18, or the like.

The client device 20 is configured as described above.

(Protocol Stack of the Present Technology)

Figure 5:
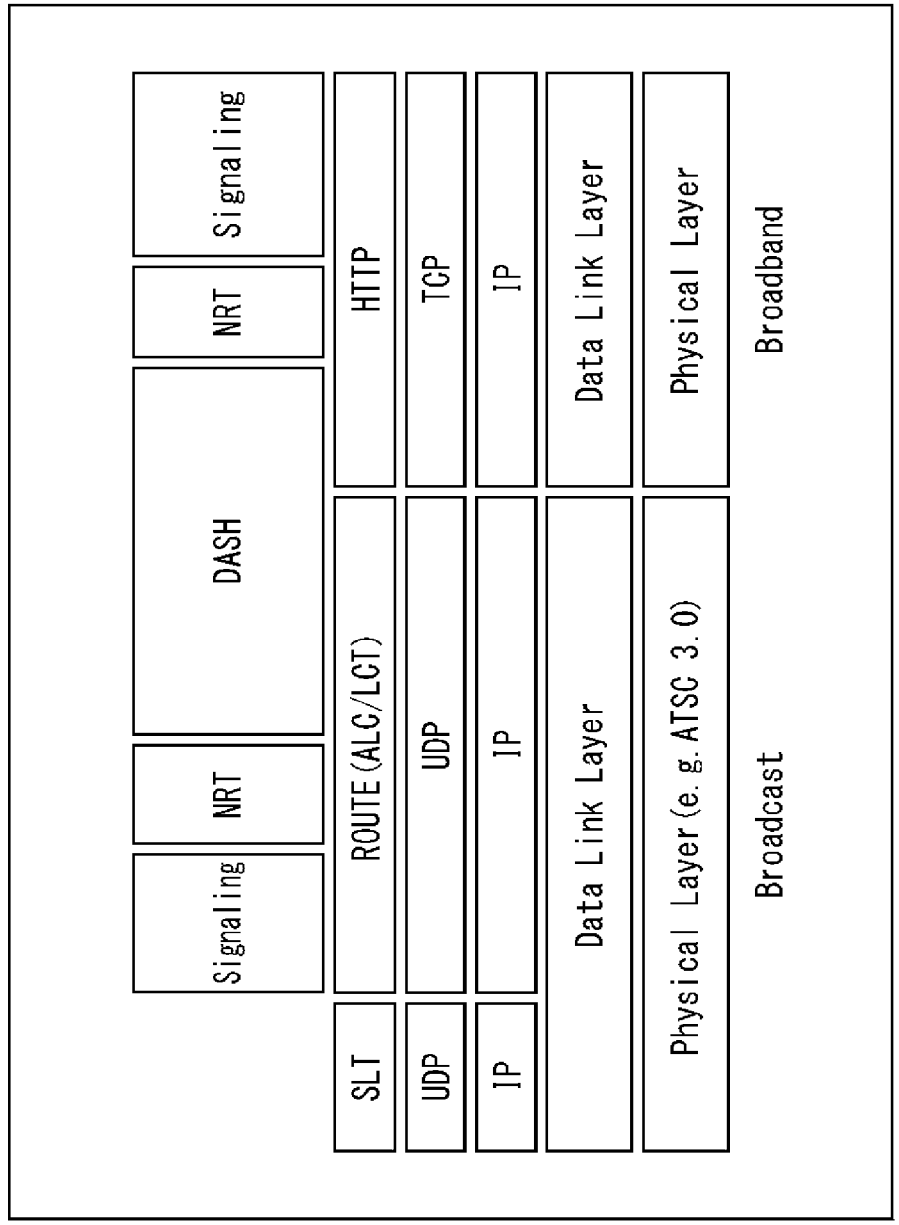
FIG. 5 is a diagram illustrating an example of a protocol stack of an IP transmission scheme of the present technology.

FIG. 5 is a diagram illustrating an example of a protocol stack of an IP transmission scheme of the present technology.

Currently, the MPEG2 Transport Stream (MPEG2-TS) scheme is widely used as a digital broadcasting transmission scheme. However, from now on, it is estimated that an Internet Protocol (IP) transmission scheme using an IP packet currently used in the field of communication will be expanding.

For example, it is expected that Advanced Television Systems Committee (ATSC) 3.0, which is one of the next generation terrestrial broadcast standards, will also be able to provide more sophisticated services by adopting the IP transmission scheme. The IP transmission scheme can also be adopted in the present technology, similarly to ATSC 3.0, or the like.

In FIG. 5, the lowest hierarchy is defined as a physical layer. In the digital broadcasting of the IP transmission scheme such as ATSC 3.0, there is a case where some data is transmitted also by using bidirectional communication as well as by transmission using unidirectional broadcasting. In the case of utilizing broadcasting (Broadcast), the physical layer corresponds to frequency bands of a broadcast wave assigned for the service (channel), or the like.

The layer coming above the physical layer is defined as a data link layer. Furthermore, the layers coming above the data link layer are defined as an Internet Protocol (IP) layer and a User Datagram Protocol (UDP) layer. The IP layer and the UDP layer are layers corresponding to the network layer and the transport layer in the hierarchical model of communication. An IP packet and a UDP packet are specified by an IP address and a port number.

Here, ATSC 3.0 assumes the use of Low Level Signaling (LLS) and Service Layer Signaling (SLS) as control information (signaling). LLS is control information transmitted in a layer below SLS. The SLS is control information defined for each unit of service. That is, in ATSC 3.0, the control information of the transport layer is transmitted in two layers, LLS and SLS.

The LLS includes metadata such as Service List Table (SLT). The SLT metadata contains basic information indicating a configuration of streams and services in a broadcasting network, such as information necessary in tuning of the service (channel). This SLT metadata is transmitted as being contained in a UDP/IP packet which is an IP packet including a UDP packet. However, the UDP/IP packet storing the SLT metadata is to be transmitted with a special IP address and port number.

The upper layer adjacent to the IP layer and the UDP layer is defined as Real-time Object Delivery over Unidirectional Transport (ROUTE). ROUTE is a protocol for streaming file transfer, which is an extension of File Delivery over Unidirectional Transport (FLUTE).

This ROUTE session is used to transmit SLS files (Signaling), Non Real Time (NRT) content files (NRT), DASH segment files (DASH), or the like, for each of services.

Here, the SLS is service level control information, providing information, attributes, and the like necessary for searching for and selecting components belonging to a target service. The SLS includes metadata such as User Service Bundle Description (USBD), Service-based Transport Session Instance Description (S-TSID), and Media Presentation Description (MPD).

The USBD metadata includes information such as the acquisition destination of other metadata.

The S-TSID metadata is an extension of LCT Session Instance Description (LSID) for ATSC 3.0 and is control information of the ROUTE protocol. In addition, the S-TSID metadata can specify Extended FDT (EFDT) transmitted in the ROUTE session. EFDT is an extension of a File Delivery Table (FDT) introduced in FLUTE, and is control information for transfer.

MPD metadata is video and audio file control information used for streaming distribution conforming to MPEG-DASH.

Here, MPEG-DASH is a streaming distribution standard according to Over The Top Video (OTT-V), and is a standard related to adaptive streaming distribution using a streaming protocol based on Hypertext Transfer Protocol (HTTP).

This MPEG-DASH standard defines: a manifest file for describing metadata that is control information of video and audio files; and a file format for transmitting moving image content. Here, the former manifest file is referred to as Media Presentation Description (MPD) while the latter file format is also referred to as a segment format.

Moreover, in a case where ROUTE is used as a transport protocol, it is possible to use am MP4 file format as a streaming file format. The MP4 file format is a derivative format of an ISO base media file format (ISO BMFF) defined by ISO/IEC 14496-12.

A segment transmitted in a ROUTE session includes an initialization segment (Initialization Segment (IS)) and a media segment (Media Segment (MS)). The initialization segment includes initialization information such as a data compression scheme. Furthermore, the media segment stores stream data of video, audio, and subtitles. That is, this media segment corresponds to the DASH segment (DASH segment file).

In this manner, the stream data of the service components (video, audio, subtitles, etc.) constituting the content of the program, etc. are transmitted in the ROUTE session in units of DASH segments conforming to the ISO BMFF standard.

Note that the NRT content is content that is reproduced after being temporarily stored in a storage of the receiver. Furthermore, files other than the NRT content (for example, files of applications and electronic service guides (ESG)) may be transmitted in the ROUTE session.

Furthermore, the SLT metadata as the LLS and the metadata such as the USBD, the S-TSID, and the MPD as the SLS may be formed as data in a text format described in a markup language such as Extensible Markup Language (XML), for example.

Meanwhile, in a case where bidirectional communication (Broadband) is used, the upper layer of the physical layer (Physical Layer) is a data link layer (Data Link Layer). Furthermore, the upper layer of the data link layer is an IP layer corresponding to the network layer. An upper layer adjacent to the IP layer is a Transmission Control Protocol (TCP) layer corresponding to the transport layer, and furthermore, an upper layer adjacent to the TCP layer is an HTTP layer corresponding to an application layer.

That is, these hierarchical layers are implemented as protocols such as TCP/IP operating on a communication channel such as the Internet.

A part of the upper layers adjacent to the HTTP layer includes layers of control information (Signaling) and NRT content (NRT). This control information includes all the control information such as the control information transmitted in the above-described ROUTE session. In addition, the NRT content is content obtained via communication, and includes an application, for example.

The layers other than the above-described layer on the upper layers adjacent to the HTTP layer are defined as the DASH segment (DASH). That is, in streaming distribution of a bidirectional communication system, stream data of service components (video, audio, subtitles, etc.) constituting content such as a Video On Demand (VOD) program are transmitted in units of DASH segments conforming to the ISO BMFF standard.

As described above, in the protocol stack of the IP transmission scheme according to the present technology, it is possible to allow a unidirectional broadcast system layer and a part of a bidirectional communication system layer to work as a common protocol, so as to transmit the stream data of the service component constituting the content in units of DASH segments conforming to the ISO BMFF standard, in the unidirectional broadcasting and the bidirectional broadcasting.

Accordingly, upper layer protocols are used in common in a case where both unidirectional broadcasting streaming distribution and bidirectional communication system streaming distribution are performed, making it possible to reduce the burden imposed on implementation and processing on each of devices.

Note that while the transmission system 1 illustrated in FIG. 1 is an example of including the broadcast system broadcast server 40 on the transmitting side so as to correspond to streaming distribution in a unidirectional broadcast system alone, the present technology can also support bidirectional communication system streaming distribution as illustrated as the protocol stack in FIG. 5. The configuration corresponding to the streaming distribution of such a bidirectional communication system will be described later with reference to FIG. 27.

2. Outline of Present Technology

Meanwhile, in a case where a destination of the request of the DASH segment from the client device 20 is fixed to the specific FW proxy device 10 in an environment where a plurality of FW proxy devices 10-1 to 10-N is installed in the network 30 like the transmission system 1 illustrated in FIG. 1, the other FW proxy devices 10 (for example, the FW proxy devices 10 additionally installed later) would not function.

Furthermore, it would be possible to manually set such that the FW proxy device 10 to which each of the client devices 20 connects may mutually different by using the proxy setting of the browser 212 executed by the client device 20. This setting method, however, might complicate the management and might lead to a failure in easily balancing the load of each of the FW proxy devices 10.

In this manner, although there has been a request to appropriately balance the load of each of the FW proxy devices 10 in an environment where a plurality of FW proxy devices 10-1 to 10-N is installed, currently there is no technical method to meet the request established.

Therefore, in a case where a plurality of FW proxy devices 10-1 to 10-N is installed, the present technology sets a master-slave relationship between the FW proxy devices 10, and causes the master proxy device 10M to appropriately redirect the DASH segment request from the client device 20. This allows, in the network 30, the load of each of the FW proxy devices 10, that is, either the master proxy device 10M or the slave proxy device 10S to be appropriately balanced.

The master-slave relationship between the FW proxy devices 10 may be manually set every time the FW proxy device 10 is added to the network 30, or may be determined by the FW proxy devices 10 themselves by performing negotiation according to the capability attribute (processing capability, storage capability, etc.) or the like, for example.

Here, for example, the FW proxy device 10 initially connected to the network 30 is assumed to be the master proxy device 10M, and thereafter, in a case where the FW proxy device 10 is added, the master proxy device 10M may be determined in accordance with the capability attribute of the FW proxy device 10. Alternatively, however, it is also allowable to fix the master proxy device 10M to allow the same FW proxy device 10 to constantly function as the master. Furthermore, the number of master proxy devices 10M is not limited to one, and a plurality of master proxy devices 10M may be installed. Installing the plurality of master proxy devices 10M would make it possible to balance the processing load of each of the master proxies 111.

The FW proxy device 10 as a master (master proxy device 10M) uses Simple Service Discovery Protocol (SSDP) of Universal Plug and Play (UPnP) or the like, for example, to disclose an Application Programming Interface (API) for adjusting the coverage range of a service (channel), and assigns a service coverage range to each of the FW proxy devices 10 as slaves (slave proxy device 10S) through the API.

Here, the master proxy device 10M generates a database for assigning a service coverage range (hereinafter referred to as a proxy service coverage range database), whereby a service coverage range is assigned to each of the FW proxy devices 10 (the master proxy 111 and the slave proxy 161 operating on each of the FW proxy devices 10).

Note that UPnP is a protocol that enables participation in a target network by merely connecting a device. In addition, SSDP is one of the protocols provided in UPnP to be used for searching and responding to devices on a network.

After receiving a DASH segment request from the client device 20, the master proxy device 10M refers to the proxy service coverage range database to specify the FW proxy device 10 in coverage and performs redirection to the FW proxy device 10. Subsequently, the FW proxy device 10 specified as a redirection device receives the content stream distributed via broadcasting within a range of the assigned service, and transmits the stream to the client device 20 via the network 30.

Note that when generating the proxy service coverage range database, the master proxy device 10M assigns the service coverage range to the FW proxy device 10 in accordance with various policies (rules).

By using such a policy, it is possible, for example, to automatically assign all the receivable services within a target area to a plurality of FW proxy devices 10, or to assign services such that a service group having higher access frequency can achieve load balancing with higher priority in consideration of a viewing history of an end user. Furthermore, in order to speed up zapping of a service (channel), it is possible to enable selection of various rules, such as integrating simultaneously receivable service groups.

Note that a unit for integrating the service groups, for example, it is possible to use a unit of broadcast stream ID (BSID). In the FW proxy device 10, data transmitted in a frequency band (for example, 6 MHz) specified by a broadcast stream ID can be obtained at one time. Details of this broadcast stream ID are described in "Table 6.2 SLT XML Format" in Non-Patent Document 1 below and the like, for example.

Non-patent document 1: ATSC Candidate Standard: Signaling, Delivery, Synchronization, and Error Protection (A/331) Doc. S33-174r 15 Jan. 2016

In addition, in a case where a new FW proxy device 10 is connected to the network 30, resetting of service coverage range is performed on one or more slave proxy devices 10S (specifically, slave proxy 161 operation on the device) sharing the same master proxy device 10M (specifically, the master proxy 111 operating on the device) among the FW proxy devices 10 connected to the network 30.

Figure 6:
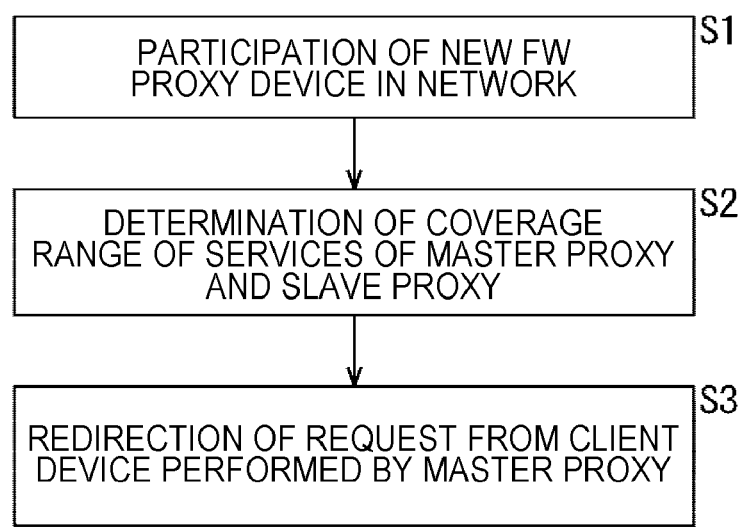
FIG. 6 is a flowchart illustrating an outline of the present technology.

Here, FIG. 6 illustrates an outline of a processing flow of assignment of the proxy service coverage range and redirection of the segment request to be performed in a case where the present technology is applied.

That is, in the network 30, when a new FW proxy device 10 is connected and participates in the network 30 (S1), the master proxy device 10M (specifically, the master proxy 111 operating on the device) determines the service coverage ranges of the master proxy 111 and the slave proxy 161 operating on the plurality of FW proxy devices 10 connected to the network 30 (S2).

At this time, the master proxy device 10M generates a proxy service coverage range database storing data associated with service ranges covered by each of the FW proxy devices 10 and notifies each of the FW proxy devices 10 of a service coverage range. Thus, each of the FW proxy devices 10 performs preparation for service tuning in accordance with the service coverage range received from the master proxy device 10M.

Thereafter, when the client device 20 is connected in the network 30 and reproduction of the content distributed via broadcasting is started, the master proxy device 10M (specifically, the master proxy 111 operating on the device) redirects a DASH segment request from the client device 20 (S3).

At this time, the master proxy device 10M refers to the proxy service coverage range database to determine the FW proxy device 10 to cover the processing of the DASH segment request from the client device 20, and transmits (redirects) the DASH segment request from the client device 20 to the determined FW proxy device 10.

As described above, by assigning the service coverage range of the proxy and processes the redirection of the segment request, it is possible to perform load balancing of the plurality of FW proxy devices 10 installed in the network 30. In the following, details will be described.

3. Load Balancing of FW Proxy Device in the Relationship Between Master Proxy and Slave Proxy (1) Example in a Case where New Slave Proxy Device is Added (Flow of Assignment of Service Coverage Range and Processing of Request Redirection)

First, a flow of a series of processing of assigning a service coverage range of a proxy and segment request redirection in a case where a new slave proxy device 10S is added will be described with reference to the flowcharts in FIGS. 7 and 8.

With FIGS. 7 and 8, a case where the new slave proxy device 10S and the client device 20 are connected in this order to the network 30 including the master proxy device 10M and an instruction on reproduction of content distributed via broadcasting is given by the client device 20 will be described.

Figure 7:
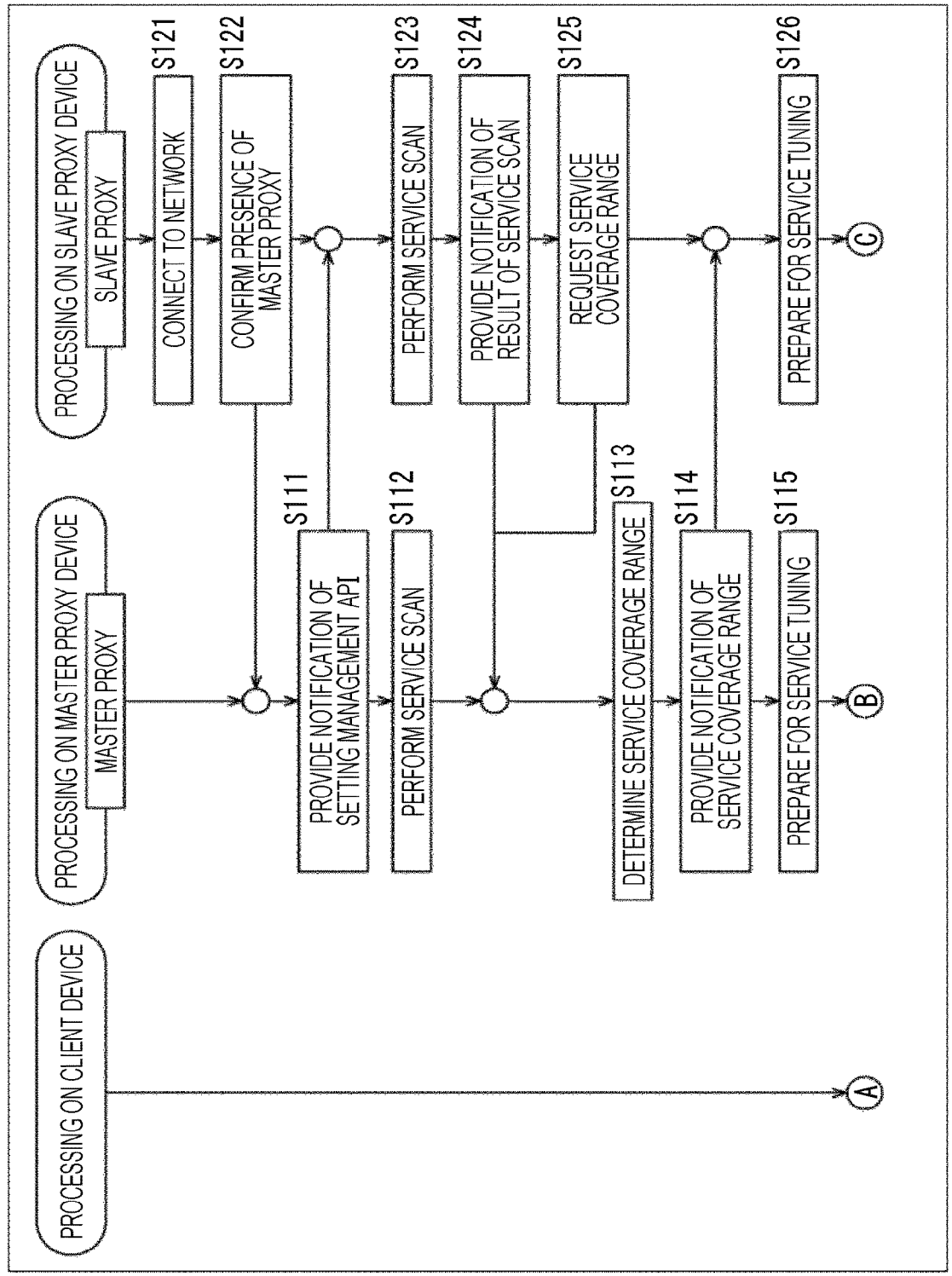
FIG. 7 is a flowchart illustrating assignment of a service coverage range of a proxy and a flow of a series of processing of redirection of a segment request.
Figure 8:
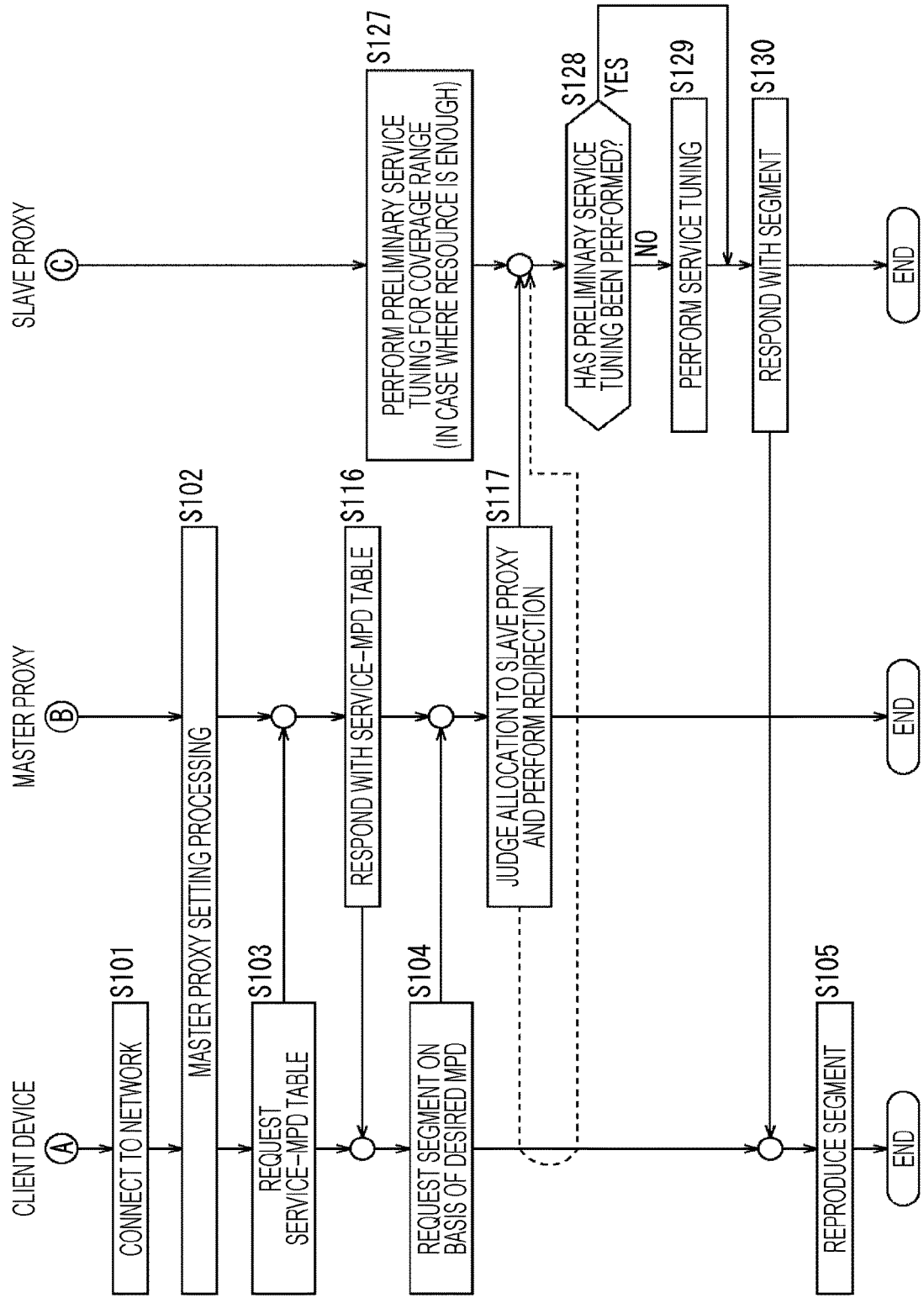
FIG. 8 is a flowchart illustrating assignment of a service coverage range of a proxy and a flow of a series of processing of redirection of a segment request.

In FIGS. 7 and 8, the processing of steps S111 to S117 is executed by the master proxy device 10M, while the processing of steps S121 to S130 is executed by the newly added slave proxy device 10S. Along with this, the processing of steps S101 to S105 is executed by the client device 20.

When a new slave proxy device 10S is connected to the network 30 (S121), in step S122, the slave proxy 161 transmits an existence confirmation message in multicast transmission to a device connected to the network 30 via the communication I/F 152 in order to confirm the existence of the master proxy 111 operating on the master proxy device 10M.

In the processing of step S122, the message transmitted by the slave proxy device 10S is received by the master proxy device 10M via the network 30.

In step S111, the master proxy 111 generates a setting management API in accordance with the message received from the slave proxy device 10S, and notifies the slave proxy device 10S of the generated setting management API via the network 30 as a response.

Note that details of the notification of the setting management API by the master proxy 111 according to the existence confirmation from the slave proxy 161 will be described later with reference to the flowchart of FIG. 9.

In the processing of step S111, the setting management API transmitted by the master proxy device 10M is received by the slave proxy device 10S via the network 30.

In step S123, the slave proxy 161 controls the tuner 151 to scan the service. Here, for example, initial scan processing is performed by the tuner 151 so as to obtain a service scan result indicating the service receivable by the slave proxy device 10S from the SLT metadata or the like transmitted as LLS.

Meanwhile, at this time, re-scan processing is performed by the tuner 101 (S112) on the master proxy device 10M as well. This enables the master proxy device 10M to obtain a service scan result indicating the service receivable by the master proxy device 10M from the SLT metadata or the like transmitted as LLS.

Note that whether or not to perform the service scan by the master proxy device 10M at the timing of execution of service scan by the slave proxy device 10S is optional.

That is, since the service receivable by the master proxy device 10M would not change frequently, once the service scan is performed, the service scan result can be continuously used. However, in a case where the master proxy device 10M is a mobile device such as a mobile receiver or an in-vehicle device, the receivable service is likely to change with an area at the present time, leading to necessity of re-execution of service scan.

In step S124, the slave proxy 161 notifies the master proxy 111 operating on the master proxy device 10M of the service scan result obtained in the processing in step S123. In addition, the slave proxy 161 requests the service coverage range from the master proxy 111 (S125).

Note that the slave proxy 161 may include the service scan result in the service coverage range request and simultaneously transmit the result.

In the processing of steps S124 and S125, the service scan result and the service coverage range request transmitted by the slave proxy device 10S are received by the master proxy device 10M.

In step S113, the master proxy 111 determines the service coverage range on the basis of the service scan result.

Here, as a service scan result, the service scan result of the master proxy device 10M itself and the service scan result of the new slave proxy device 10S are obtained. Subsequently, the master proxy 111 determines the service coverage range of each of the FW proxy devices 10 in accordance with a predetermined policy (rule) using these service scan results.

As described above, by using a policy here, it is possible, for example, to automatically assign all the receivable services within a target area to a plurality of FW proxy devices 10, or to assign services such that a service group having higher access frequency can achieve load balancing with higher priority in consideration of a viewing history of an end user. Note that details of the policy will be described later with reference to FIGS. 21 to 24.

In addition, here, it is allowable to obtain the capability attribute (for example, processing capability, etc.) of each of the FW proxy devices 10 and thereby enabling determination of the service coverage range corresponding to the policy by using the obtained capability attribute. This makes it possible for the FW proxy device 10 having a high processing capability to broaden the service coverage range, for example.

Note that herein a proxy service coverage range database that associates each of the FW proxy devices 10 (master proxy 111 and slave proxy 161) with the service coverage range is generated and stored in the storage unit 103.

In step S114, the master proxy 111 notifies the slave proxy 161 of information indicating the service coverage range (hereinafter referred to as service coverage range information) determined in the processing of step S113.

In the processing of step S114, the service coverage range information transmitted by the master proxy device 10M is received by the slave proxy device 10S.

In step S126, the slave proxy 161 controls the tuner 151 on the basis of the service coverage range information received from the master proxy device 10M to prepare for tuning the service in the coverage range of the slave proxy 161. Here, preparations for tuning of each of services indicated by the service coverage range information are performed.

Meanwhile, at this time, the master proxy device 10M also prepares for tuning the service in the own coverage range (S115). Note that it is allowable that, in the slave proxy device 10S, service tuning be preliminarily performed for services within the coverage range (S127 in FIG. 8) in a case where the resource is enough.

Thereafter, as illustrated in FIG. 8, when the client device 20 is connected to the network 30 (S101), master proxy setting processing is performed between the client device 20 and the master proxy device 10M (S102).

In this master proxy setting processing, connection is established between the client device 20 and the master proxy 111 operating on the master proxy device 10M. Note that details of the master proxy setting processing will be described later with reference to the flowchart of FIG. 18.

In step S103, the application 211 requests the master proxy 111 for the service-MPD table.

In the processing of step S103, the request for the service-MPD table transmitted from the client device 20 is received by the master proxy device 10M via the network 30.

In step S116, the master proxy 111 generates a service-MPD table in response to the request for the table received from the client device 20 and replies with the generated table to the client device 20 via the network 30 as a response.

Here, the service-MPD table is a table associating the service with MPD metadata. The service-MPD table is generated from the SLS. Note that herein while the following description assumes that the service-MPD table is generated by the master proxy 111 for simplicity of explanation, the service-MPD table may be generated by the SLS processing system 115.

In the processing of step S116, the service-MPD table transmitted by the master proxy device 10M is received by the client device 20 via the network 30.

In step S104, the application 211 refers to the service-MPD table received from the master proxy device 10M and requests the master proxy 111 for the DASH segment on the basis of the MPD metadata corresponding to the desired service.

In the processing of step S104, the request for the DASH segment transmitted from the client device 20 is received by the master proxy device 10M via the network 30.

In step S117, the master proxy 111 refers to the proxy service coverage range database to judge the allocation of the DASH segment request received from the client device 20 to the slave proxy 161, and performs redirection according to the judgment result.

This causes the request of the DASH segment from the client device 20 (specifically, the application 211 on the device) to be redirected to the appropriate slave proxy 161 by the master proxy 111.

Note that herein while it is described that the master proxy 111 directly notifies the slave proxy 161 of the DASH segment request to be redirected in order to simplify the explanation, notification in reality is made, as indicated by the dotted line in FIG. 8, from the master proxy 111 to the slave proxy 161 substantially indirectly via the client device 20. Furthermore, details of the redirection of the segment request will be described later with reference to FIGS. 25 and 26.

In the processing of step S117, the DASH segment request redirected by the master proxy device 10M is received by the slave proxy device 10S on which the slave proxy 161 judged to be appropriate is operating.

In step S128, the slave proxy 161 determines whether preliminary service tuning has been performed. Here, in a case where the resource is not enough and the preliminary service tuning has not been performed in the processing of the above-described step S127, determination is "NO" in the determination processing of step S128, and the processing proceeds to step S129.

In step S129, the slave proxy 161 controls the tuner 101 to tune the service on the basis of the DASH segment request received from the master proxy device 10M. This leads to acquisition of the DASH segment file corresponding to the DASH segment request from the broadcast server 40 via broadcasting.

In contrast, in a case where the resource is enough and the preliminary service tuning has been performed in the processing of the above-described step S127, the stream of the service in the coverage range obtained via broadcasting from the broadcast server 40 has already been developed, and thus, the processing of step S129 is skipped. In this case, the DASH segment file corresponding to the DASH segment request is obtained from the developed stream.

When the DASH segment file is obtained, the processing proceeds to step S130. In step S130, the slave proxy 161 replies with the DASH segment file received from the broadcast server 40 to the client device 20 connected to the network 30 via the communication I/F 102.

In the processing of step S130, the DASH segment file transmitted (transferred) by the slave proxy device 10S is received by the client device 20 via the network 30.

In the client device 20, the browser 212 reproduces the DASH segment file received from the slave proxy device 10S (S105). This enables the client device 20 to reproduce the content such as programs distributed via broadcasting.

The above has described a flow of a series of processing of assigning the service coverage range of the proxy and redirecting the segment request in a case where a new slave proxy device 10S is added.

(Details of Notification of Setting Management API)

Next, with reference to the flowchart of FIG. 9, details of the notification of the setting management API by the master proxy 111 corresponding to the existence confirmation from the slave proxy 161 will be described. That is, the processing illustrated in the flowchart of FIG. 9 corresponds to the processing of steps S122 and S111 of FIG. 7 described above.

In step S151, similarly to step S122 in FIG. 7, in order to confirm the existence of the master proxy 111 operating on the master proxy device 10M, the slave proxy 161 operating on the new slave proxy device 10S performs multicast transmission of a M-SEARCH request to the device connected to the network 30.

This M-SEARCH request is an HTTP request to be used when searching for a device connected to the network 30 by using a protocol of SSDP.

In the processing of step S151, the M-SEARCH request transmitted by the slave proxy device 10S is received by the master proxy device 10M via the network 30.

In step S141, the UPnP/SSDP server 112 generates a device description URL in response to the M-SEARCH request received from the slave proxy device 10S and transmits the generated device description URL as an M-SEARCH response to the slave proxy device 10S via the network 30.

This M-SEARCH response is a response to the M-SEARCH request, and includes the device description URL as LOCATION. This device description URL is a URL of a file in XML format.

In the processing of step S141, the M-SEARCH response transmitted by the master proxy device 10M is received by the slave proxy device 10S via the network 30.

In step S152, the slave proxy 161 requests the local web server 114 operating on the master proxy device 10M connected to the network 30 for a device description on the basis of the M-SEARCH response (specifically, device description URL of the response) received from the master proxy device 10M.

This device description request is an HTTP request describing content corresponding to the device description URL of the M-SEARCH response, as a target resource of a GET method.

In the processing of step S152, the device description request transmitted by the slave proxy device 10S is received by the master proxy device 10M via the network 30.

In step S142, the local web server 114 generates a device description in response to the device description request received from the slave proxy device 10S, and transmits the generated device description as a response to the slave proxy device 10S via the network 30.

FIG. 10 is a diagram illustrating an example of the device description response.

Note that although the example of FIG. 10 omits description, the header of the device description response includes description of the file type or the like. Furthermore, the header is followed by content of the device description in XML format.

That is, as illustrated in FIG. 10, "urn:schemas-upnp-org:device-1-0" is described as an xmlns attribute of a root element in the device description, so as to declare that it is a UPnP-compliant device description.

A serviceList element describes a list of services supported by the master proxy device 10M. The serviceList element describes one or more service elements.

The service element describes information related to one service among the supported services. The service element functions as an upper element of a serviceType element, a serviceId element, a SCPDURL element, a controlURL element, or the like.

In the example of FIG. 10, two service elements are described.

In the first service element, "service:urn:atsc:proxy" is described as a service type in the serviceType element, representing a proxy service of the ATSC 3.0 service.

Furthermore, the serviceId element has a description of "urn:UPnP:serviceId:1234" as the service ID, representing a service ID of the proxy service.

Furthermore, the controlURL element has a description of "http://192.168.1.1:23456/getATSC3.0ProxyAddressPort" as an URL of the proxy listening address/port acquisition API. This URL is information for calling up the Web API for obtaining the proxy listening address/port indicating the IP address and port number at which the master proxy 111 listens for a request.

In the second service element, "urn:atsc:configMan" is described as the service type in the serviceType element, representing that it is a setting management service of ATSC 3.0.

Furthermore, the serviceId element has a description of "urn:UPnP:serviceId:5678" as the service ID, representing a service ID of the proxy service.

Furthermore, "http://192.168.1.1:23456/getServiceScope" is described as the URL of the setting management API in the controlURL element. This URL is information used by the master proxy 111 to call the Web API for obtaining service coverage range information.

Note that in each of service elements, usually the address of the service description for the ACR client service is described in the SCPDURL element, and thus, the service description is obtained by a GET method defined by HTTP. In that case, an action is called by sending an action message to the URL described in the controlURL element by a Simple Object Access Protocol (SOAP) defined by UPnP.

In contrast, the present technology proposes a method of announcing the URL of the Web API by a method different from definition of UPnP so that the Web API can be called more conveniently. That is, in the present technology, nothing is described as the value of the SCPDURL element (the content of the SCPDURL element is left empty) as illustrated in FIG. 10, and the URL of the Web API can be described directly in the controlURL element only in a case where nothing is described in the SCPDURL element.

Note that as a condition for directly describing the URL of the Web API in the controlURL element, it is allowable, for example, to describe a dummy character string in the controlURL element in addition to emptying the content of the SCPDURL element as described above.

Returning to FIG. 9, in the processing of step S142, the device description response transmitted by the master proxy device 10M is received by the slave proxy device 10S that has transmitted the device description request.

Subsequently, the slave proxy device 10S is to obtain the service coverage range information from the master proxy 111 operating on the master proxy device 10M on the basis of the device description response received from the master proxy device 10M.

Figure 9:
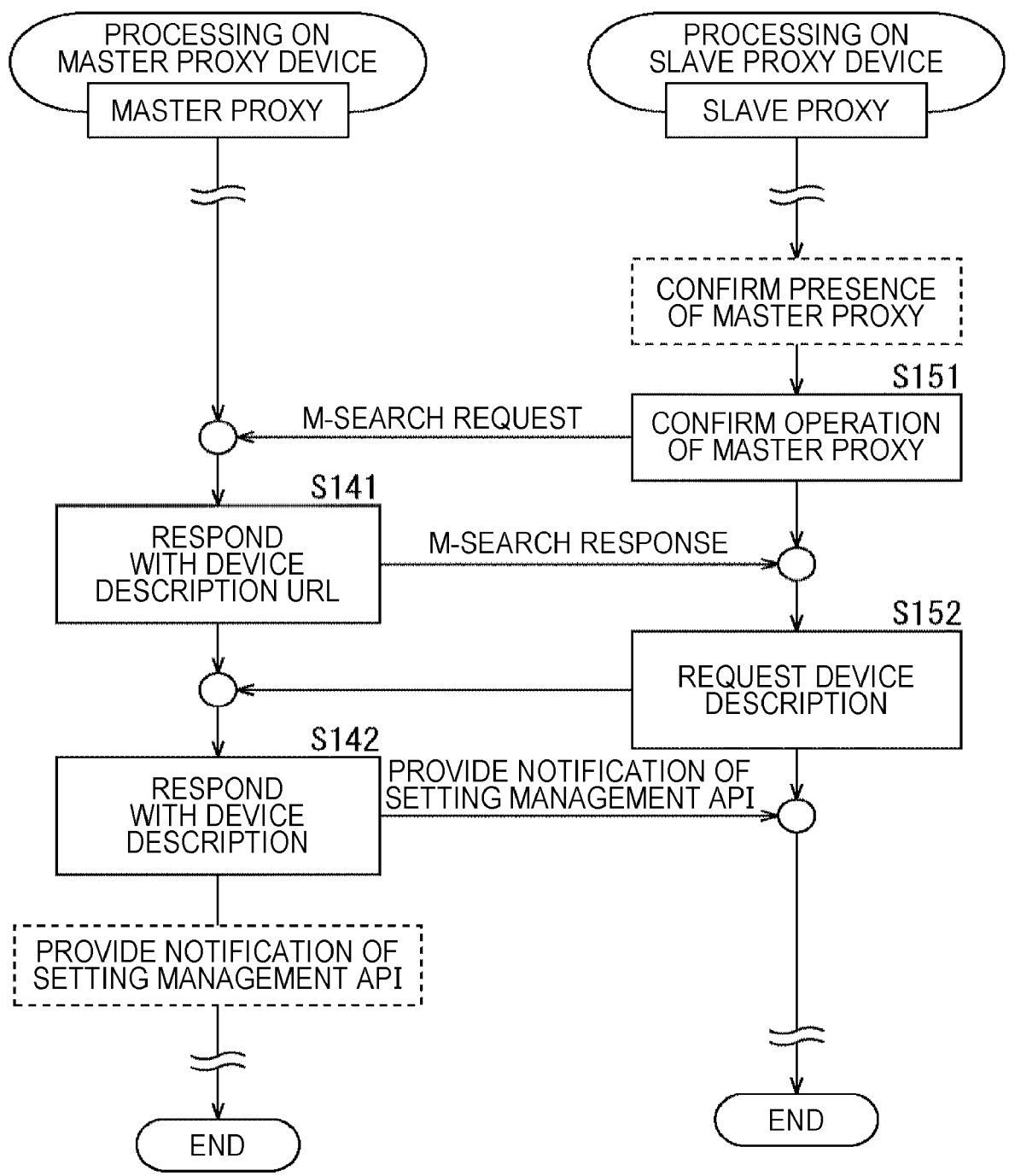
FIG. 9 is a flowchart illustrating details of notification of a setting management API by a master proxy according to existence confirmation from a slave proxy.

Here, while the flowchart of FIG. 9 has no description of the processing after reception of the device description response in the slave proxy 161 operating in the slave proxy device 10S, the following process is performed.

That is, the slave proxy 161 requests the service coverage range from the master proxy 111 on the basis of the URL of the setting management API of the device description response. Note that the processing of the slave proxy 161 corresponds to the processing of step S125 of FIG. 7 described above.

FIG. 11 is a diagram illustrating an example of a service coverage range request.

The service coverage range request includes description of service coverage range information being "getServiceScope" as a GET method target resource. Furthermore, HOST includes description of "192.168.1.1:23456" as a host name.

That is, in the service coverage range request, the GET method target is "getServiceScope" in accordance with content (content of the controlURL element) described in the device description response. Furthermore, the IP address of the master proxy device 10M, that is "192.168.1.1" and the port number of the master proxy 111, which is, "23456" are described as HOST in the service coverage range request.

Such service coverage range request is received by the master proxy device 10M connected to the network 30. Subsequently, the master proxy 111 generates service coverage range information in response to the service coverage range request received from the slave proxy device 10S, and transmits the generated information as a response to the slave proxy device 10S via the network 30. Note that the processing of the master proxy 111 corresponds to the processing of steps S113 and S114 in FIG. 7 described above.

Note that a service scan result obtained in the processing of step S123 may be described for a body of the service coverage range request.

Figure 12:
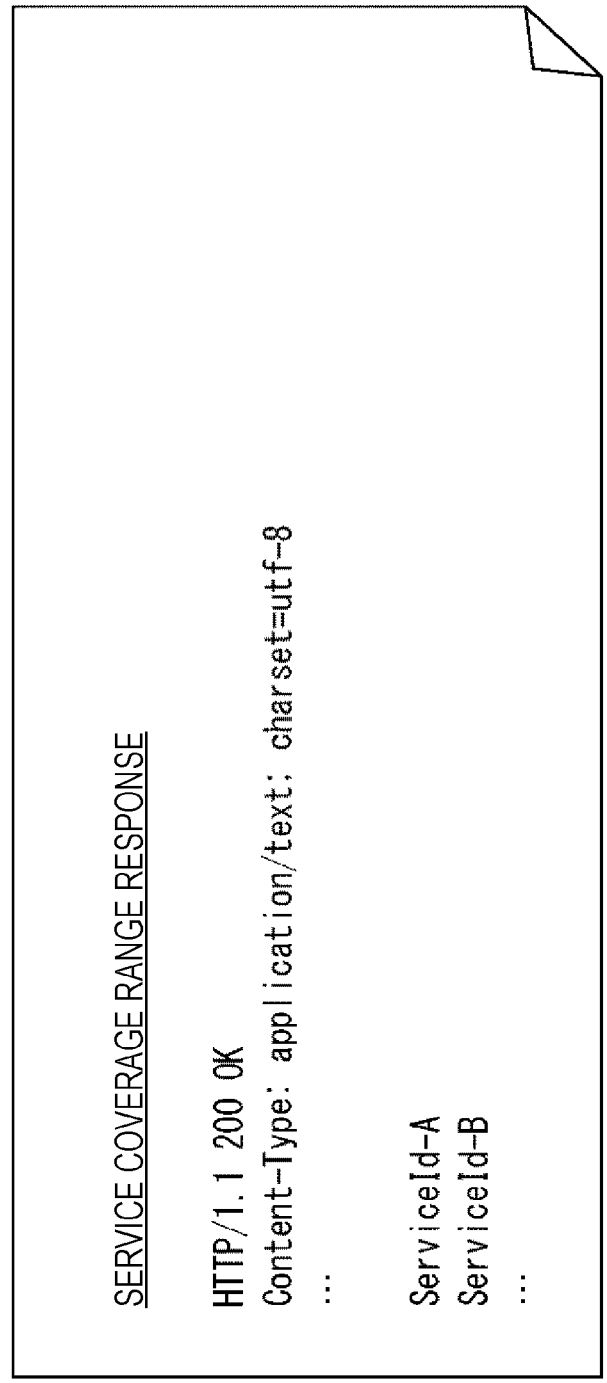
FIG. 12 is a diagram illustrating an example of a service coverage range response.

FIG. 12 is a diagram illustrating an example of a service coverage range response.

A list of service IDs such as "ServiceId-A" and "ServiceId-B" is described as service coverage range information in a body portion of the service coverage range response. This list is a list enumerating character strings indicating service IDs by line feed.

That is, the service A of the service ID "ServiceId-A" and the service B of the service ID "ServiceId-B" have been assigned as the service coverage range of the slave proxy 161 by the master proxy 111.

Such service coverage range response is received by the slave proxy device 10S connected to the network 30. Subsequently, the slave proxy device 10S prepares for service tuning on the basis of the service coverage range response (service coverage range information) received from the master proxy device 10M.

Here, for example, the slave proxy device 10S prepares for receiving the streams of the service A and the service B. Note that the processing of the slave proxy 161 corresponds to the processing of step S126 of FIG. 7 described above. Furthermore, at this time, the master proxy device 10M also prepares for service tuning (S115 in FIG. 7).

Figure 13:
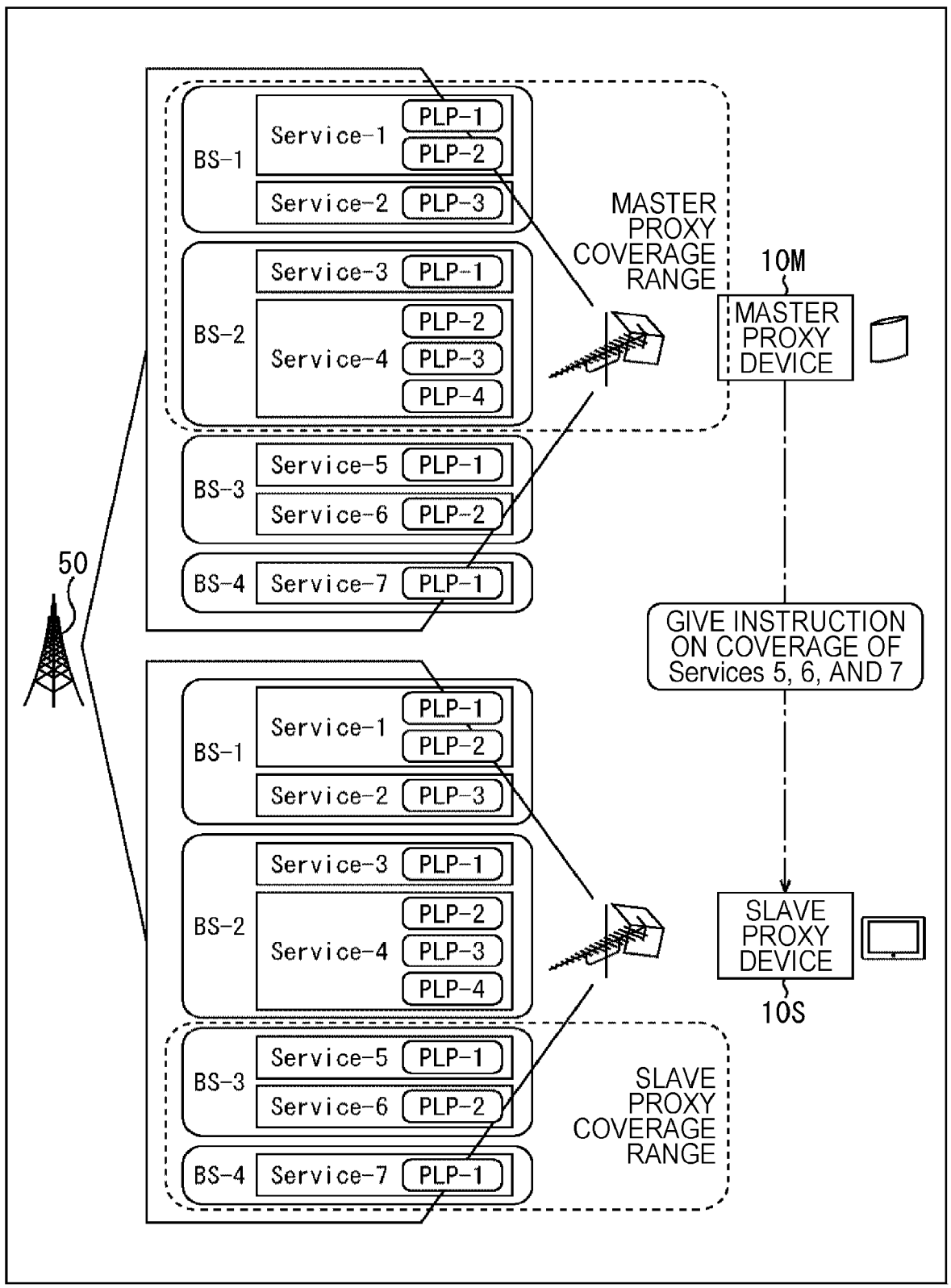
FIG. 13 is a diagram illustrating an example of service coverage range assignment by a master proxy.

As described above, the service coverage range is assigned to the slave proxy device 10S. FIG. 13 illustrates a more specific example of assignment of the service coverage range.

That is, FIG. 13 illustrates an assumable case where seven services of Service 1 (Service-1), Service 2 (Service-2), Service 3 (Service-3), Service 4 (Service-4), Service 5 (Service-5), Service 6 (Service-6), and Service (Service-7), are scanned as broadcasting services receivable by the master proxy device 10M and the slave proxy device 10S.

Note that the stream of each of services is identified by service ID. In addition, the stream of each of services is transmitted by a broadcast stream (BS) identified by a broadcast stream ID. Furthermore, in the stream of each of services, a Physical Layer Pipe (PLP) stream identified by the PLP ID is transmitted.

A stream of Service 1 including PLP-1 and PLP-2 and a stream of Service 2 including PLP3 are transmitted on a broadcast stream 1 (BS-1). Furthermore, a stream of Service 3 including PLP-1 and a stream of Service 4 including PLP-2, PLP-3, and PLP-4 are transmitted on a broadcast stream 2 (BS-2).

A stream of Service 5 including PLP-1 and a stream of Service 6 including PLP-2 are transmitted on a broadcast stream 3 (BS-3). Furthermore, a stream of Service 7 including PLP-1 is transmitted on a broadcast stream 4 (BS-4).

The master proxy 111 operating on the master proxy device 10M determines the service coverage range covered by the master proxy 111 and the slave proxy 161 on the basis of these service scan results. In the example of FIG. 13, among the scanned broadcasting services, the services 1 to 4 are assigned to the service coverage range of the master proxy 111, while the services 5 to 7 are assigned to the service coverage range of the slave proxy 161.

As described above, assignment of such service coverage range is implemented by the setting management API given an notification from the master proxy 111 to the slave proxy 161.

The details of the notification of the setting management API by the master proxy 111 according to the existence confirmation from the slave proxy 161 have been described above.

(2) Example in the Case where New Slave Proxy Device is Further Added (Flow of Assignment Processing of Service Coverage Range)

Next, with reference to the flowchart of FIG. 14, a flow of assignment processing of the service coverage range of the proxy in a case where a new slave proxy device 10S is further added will be described.

Figure 14:
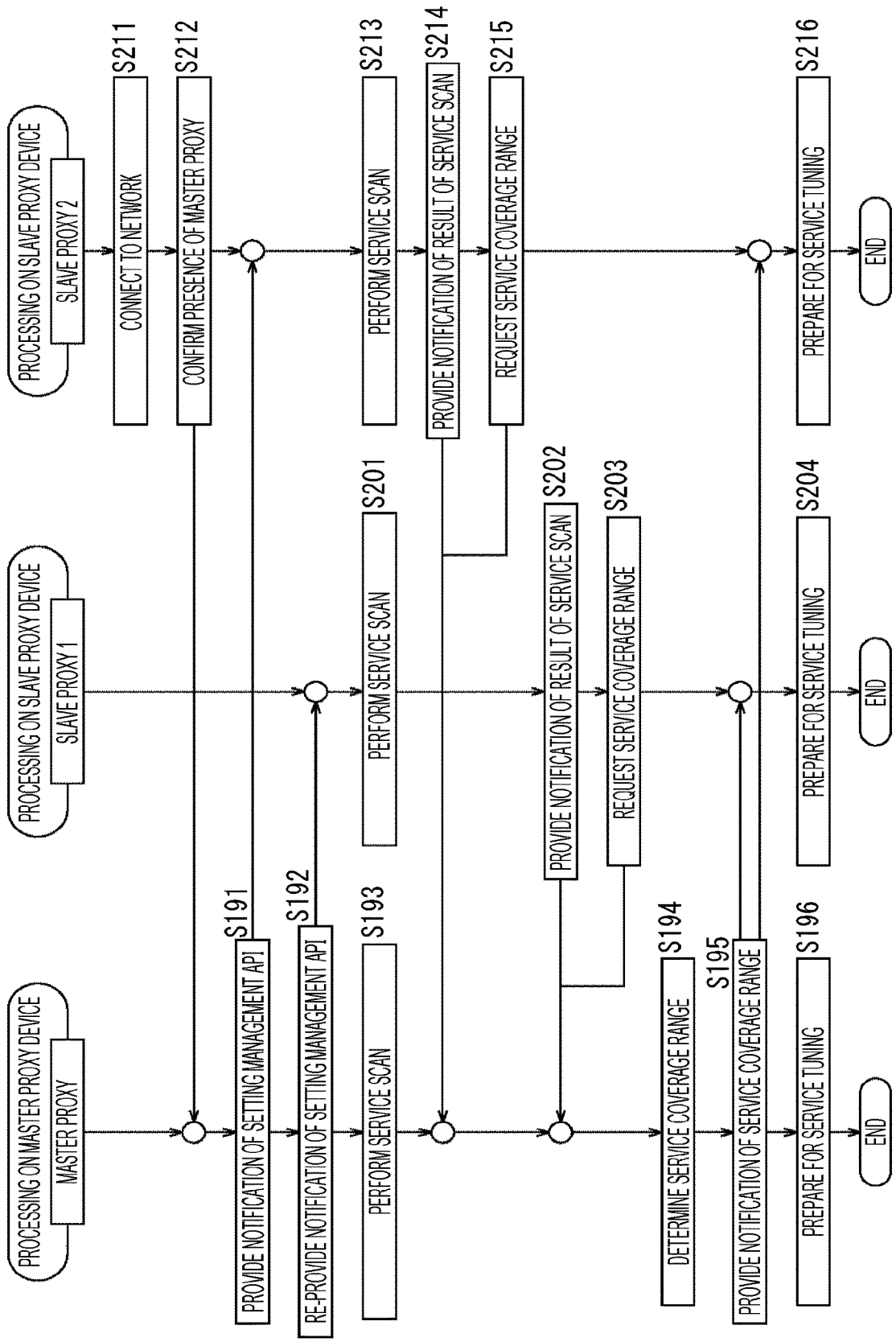
FIG. 14 is a flowchart illustrating a flow of service coverage range assignment processing in a case where a new slave proxy is added.

In the illustration of FIG. 14, a case where a new slave proxy device 10S-2 is further connected to the network 30 including the master proxy device 10M and the slave proxy device 10S-1 will be described.

Note that in the following description, a slave proxy 161 that is operated on the slave proxy device 10S-1 will be referred to as a slave proxy 161-1 (abbreviated as "slave proxy 1" in the figure), while a slave proxy 161 operating on the slave proxy device 10S-2 will be referred to as a slave proxy 161-2 (abbreviated as "slave proxy 2" in the figure) for distinction.

Furthermore, the processing of steps S191 to S196 in FIG. 14 is executed by the master proxy device 10M. Along with this, the processing of steps S201 to S204 is executed by the slave proxy device 10S-1, while the processing of steps S211 to S216 is executed by the slave proxy device 10S-2.

When the new slave proxy device 10S-2 is connected to the network 30 (S211), in step S212, the slave proxy 161-2 transmits an existence confirmation message in multicast transmission to a device connected to the network 30 via the communication I/F 152 in order to confirm the existence of the master proxy 111.

In steps S191 and S192, the master proxy 111 generates a setting management API in accordance with the message transmitted in multicast transmission, and notifies (re-notifies) the slave proxy device 10S-1 and the slave proxy device 10S-2 of the generated setting management API via the network 30.

In step S213, the slave proxy 161-2 controls the tuner 151 in accordance with the notification from the master proxy device 10M to scan the service. Here, for example, initial scan processing is performed by the tuner 151 so as to obtain a service scan result indicating the service receivable by the slave proxy device 10S-2 from the SLT metadata or the like transmitted as LLS.

At this time, the slave proxy device 10S-1 on which the slave proxy 161-1 operates re-scans the service in accordance with the notification from the master proxy device 10M so as to obtain a service scan result (S201). Furthermore, re-scanning of the service is also performed in the master proxy device 10M on which the master proxy 111 operates and the service scan result is obtained (S193).

Note that whether or not to perform the service scan by the master proxy device 10M and the slave proxy device 10S-1 at the timing of execution of service scan by the slave proxy device 10S-2 as described above is optional.

When the scan of the service (S213) is finished, the slave proxy 161-2 performs notification of the service scan result and makes a request for the service coverage range toward the master proxy 111 (S214 and S215).

Similarly, when the scan of the service (S201) is finished, the slave proxy 161-1 performs notification of the service scan result and makes a request for the service coverage range toward the master proxy 111 (S202 and S203).

The service scan result and the service coverage range request transmitted by the slave proxy devices 10S-1 and 10S-2 are received by the master proxy device 10M.

In step S194, the master proxy 111 determines the service coverage range on the basis of the service scan result.

The service scan results obtained here include the service scan result of the master proxy device 10M itself, the service scan result of the existing slave proxy device 10S-1, and the service scan result of the new slave proxy device 10S-2. Subsequently, the master proxy 111 determines the service coverage range of each of the FW proxy devices 10 in accordance with a predetermined policy (rule) using these service scan results.

Herein a proxy service coverage range database that associates each of the FW proxy devices 10 (master proxy 111 and slave proxies 161-1 and 161-2) with the service coverage range is generated and stored in the storage unit 103. Note that details of the policy will be described later with reference to FIGS. 21 to 24.

In step S195, the master proxy 111 notifies the slave proxy 161-1 and the slave proxy 161-2 of the service coverage range obtained in the processing of step S194.

The slave proxy device 10S-2 on which the slave proxy 161-2 operates controls the tuner 151 on the basis of the service coverage range information received from the master proxy device 10M to prepare for tuning the service in the own coverage range of the slave proxy 161-2 (S216).

Similarly, the slave proxy device 10S-1 on which the slave proxy 161-2 operates prepares for tuning the service in the coverage range of the slave proxy 161-2 corresponding to the service coverage range information received from the master proxy device 10M (S204). Furthermore, the master proxy device 10M also prepares for tuning the service in the coverage range of oneself (S196).

In this manner, in each of the FW proxy devices 10 connected to the network 30, preparation for tuning the service in the own coverage range is completed, so as to allow an appropriate FW proxy device 10 within the network 30 to manage in response to the DASH segment request from the client device 20.

Figure 15:
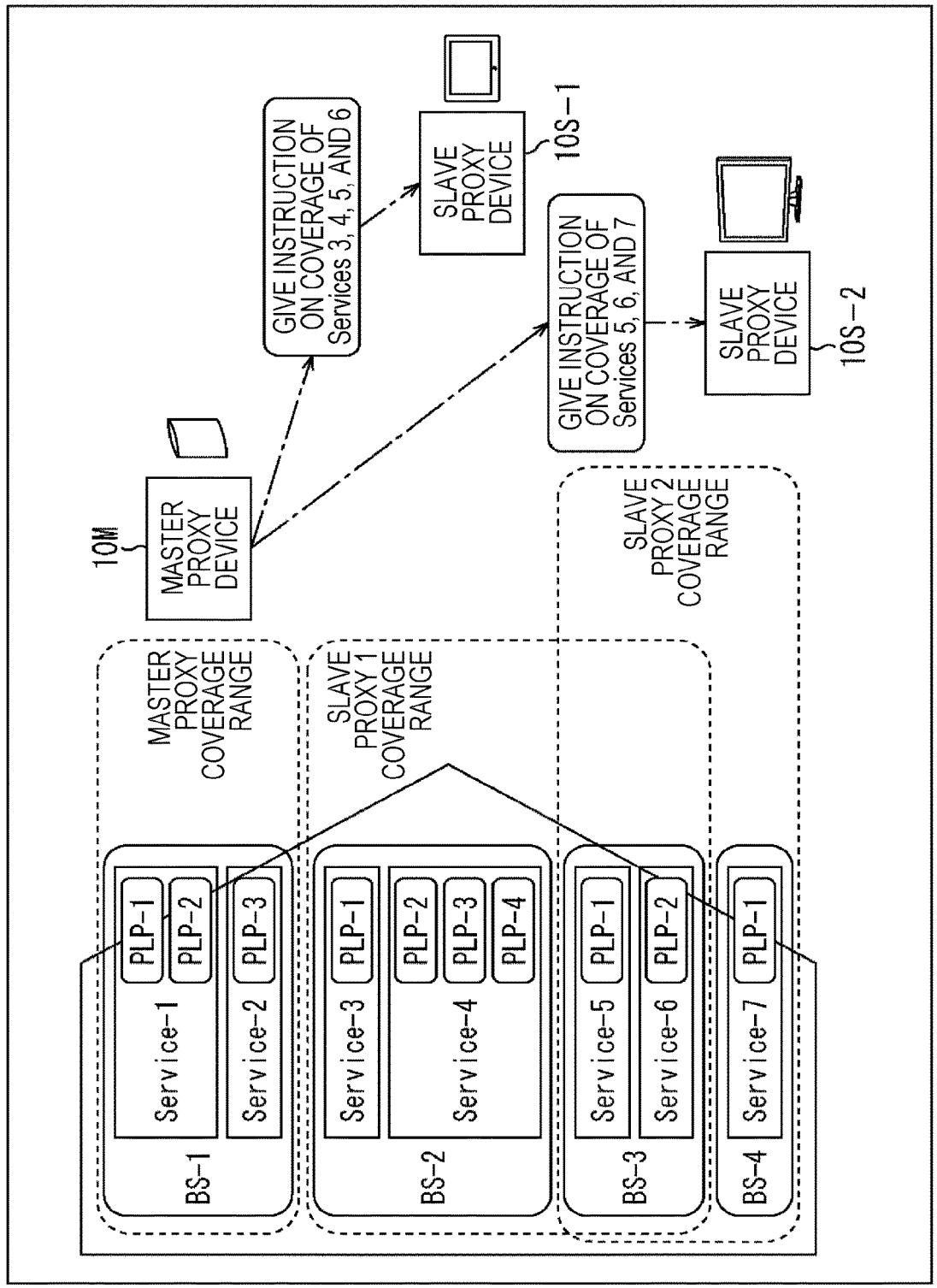
FIG. 15 is a diagram illustrating an example of assignment of a service coverage range by a master proxy.

Here, FIG. 15 illustrates a more specific example of assignment of the service coverage range. Note that the relationship between the broadcast stream, service stream, and PLP stream in FIG. 15 is similar to the relationship in FIG. 13.

In the example of FIG. 15, among the scanned broadcasting services, Services 1 and 2 are assigned to the service coverage range of the master proxy 111, Services 3 to 6 are assigned to the service coverage range of the slave proxy 161-1, and Services 5 to 7 are assigned to the service coverage range of the slave proxy 161-2.

In this example, Services 5 and 6 are covered both by the slave proxy 161-1 and the slave proxy 161-2 in an overlapping manner. This assignment of the coverage range can be performed in a case where there is high possibility of selecting (tuning) Services 5 and 6, or the like, for example. Alternatively, however, as in the example of FIG. 13, it is also allowable to prohibit the master proxy 111 and the slave proxy 161 from having overlapping service coverage range.

Note that the processing of redirection of the segment request is similar to the processing illustrated in FIG. 8, and thus, the description thereof will be omitted here.

As described above, the flow of the processing of assigning the service coverage range of the proxy in the case where a new slave proxy device 10S is further added has been described.

(Details of Re-Notification of Setting Management API)

Figure 16:
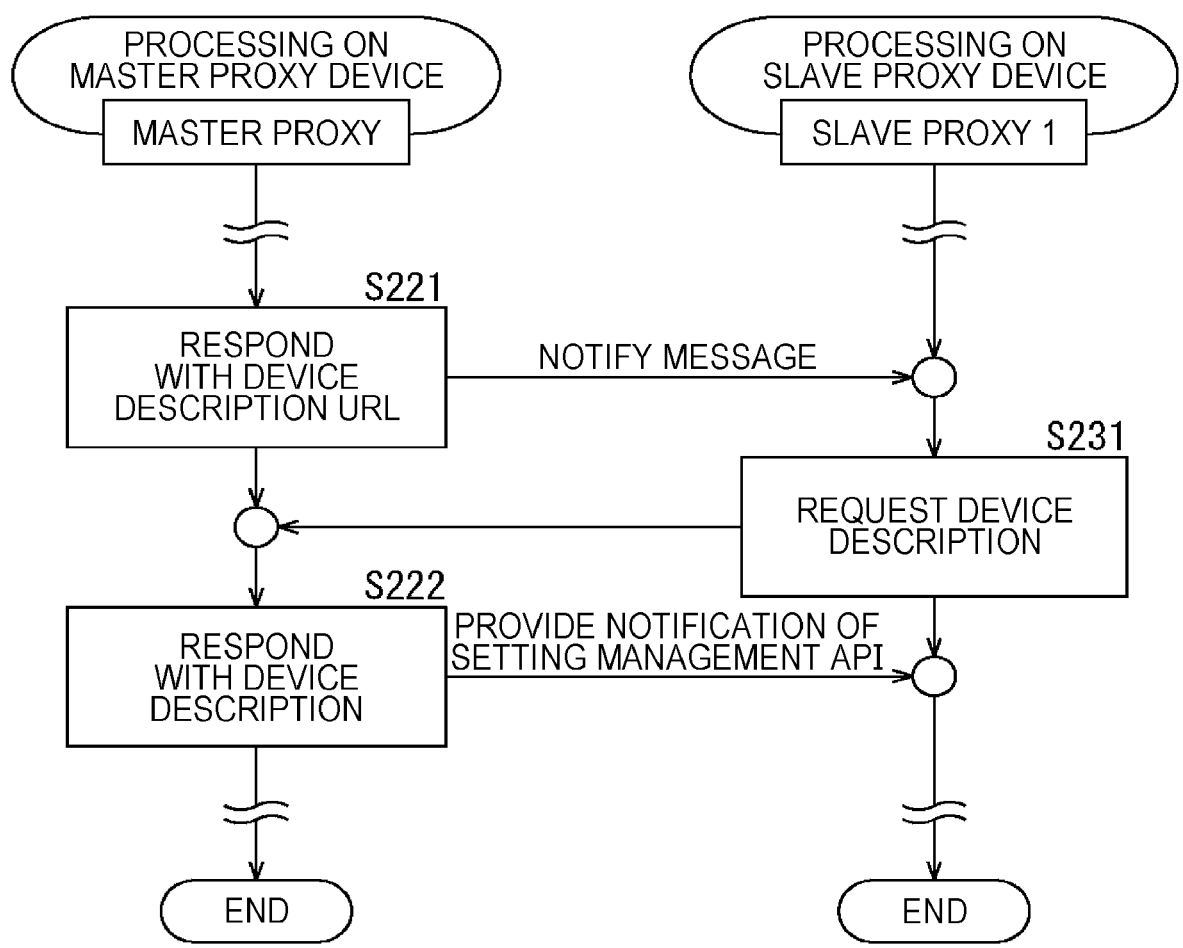
FIG. 16 illustrates details of re-notification of setting management API to an existing slave proxy by the master proxy.

Next, with reference to the flowchart of FIG. 16, details of re-notification of the setting management API to the existing slave proxy 161-1 by the master proxy 111 will be described. That is, the processing illustrated in the flowchart of FIG. 16 corresponds to the processing of step S192 of FIG. 14 described above.

In step S221, the UPnP/SSDP server 112 generates a device description URL in response to the M-SEARCH request received from the slave proxy device 10S-2, and transmits the generated device description URL as a NOTIFY message to the slave proxy device 10S-1 via the network 30.

Figure 17:
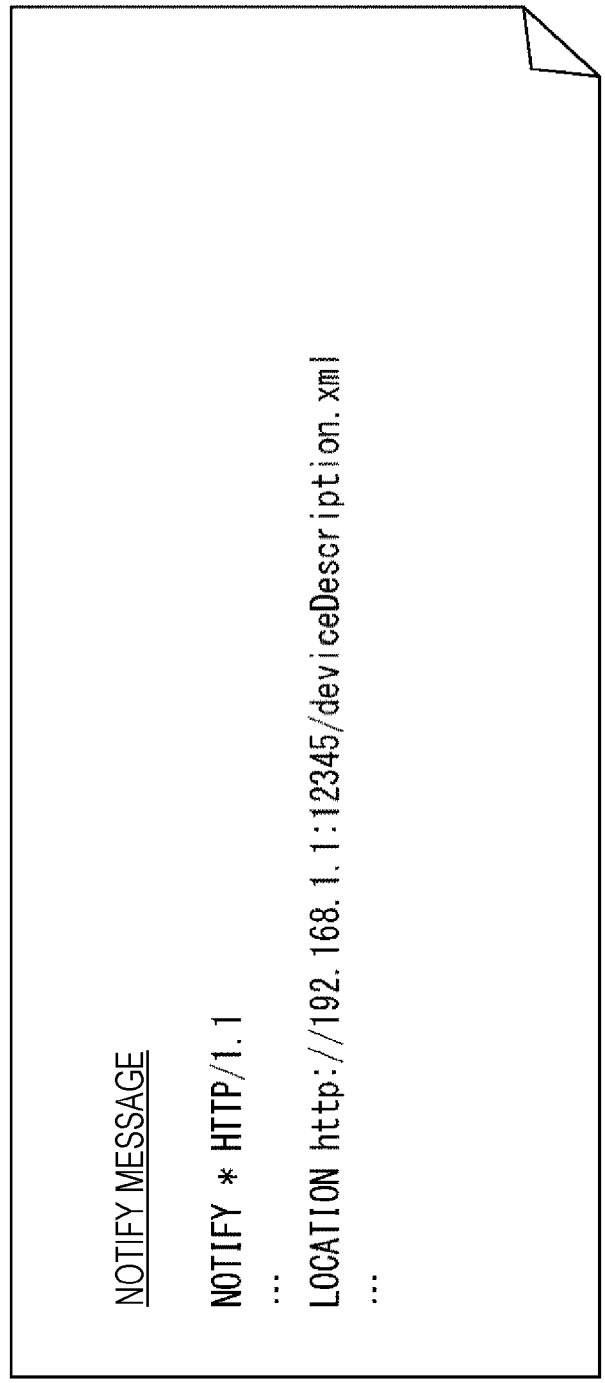
FIG. 17 is a diagram illustrating an example of a NOTIFY message.

FIG. 17 is a diagram illustrating an example of a NOTIFY message.

In the NOTIFY message, "http://192.168.1.1:12345/deviceDescription.xml" is specified as the device description URL at LOCATION. This device description URL is a URL of a file in XML format.

That is, since the file in XML format is processed by the local web server 114 on the master proxy device 10M, the device description URL contains description of "192.168.1.1" as an IP address assigned to the master proxy device 10M and description of "12345" as the port number assigned to the local web server 114.

Returning to FIG. 16, in step S231, the slave proxy 161-1 requests the local web server 114 operating on the master proxy device 10M connected to the network 30 for a device description on the basis of the NOTIFY message (specifically, device description URL of the message) received from the master proxy device 10M.

This device description request is an HTTP request describing content corresponding to the device description URL of the NOTIFY message, as a target resource of a GET method.

In step S222, the local web server 114 generates a device description in response to the device description request received from the slave proxy device 10S-1, and transmits the generated device description as a response to the slave proxy device 10S-1 via the network 30. Note that content of this device description response is as illustrated in FIG. 10 described above.

Subsequently, the slave proxy device 10S-1 obtains service coverage range information from the master proxy 111 on the basis of the device description response received from the master proxy device 10M.

The details of re-notification of the setting management API to the existing slave proxy 161-1 by the master proxy 111 have been described above.

(3) Example of Discovery and Connection of Master Proxy by Client Device

Meanwhile, there are several methods of discovering and connecting the master proxy 111 operating on the master proxy device 10M that might be installed in the end user's home 2, a head end of the cable operator, the base station of the mobile network, or the like.

Examples of these include a method implemented, using an Internet connection setting menu of the browser 212 on the client device 20, that is, a method of manually inputting the IP address, the port number, or the like of the master proxy 111, a method of registering the URL of the proxy setting script, a method using automatic setting, or the like.

Examples of a method of automatic setting include a method using a Dynamic Host Configuration Protocol (DHCP) server, a method using Web Proxy Auto Discovery (WPAD), and the like. Furthermore, in the automatic setting by the proxy setting script, a proxy automatic configuration script file described in a script language such as JavaScript (registered trademark) is prepared and the file is arranged on the web server, while the URL of the file may be set as the URL of the automatic setting script of the browser 212.

In the case of using WPAD, the browser 212 itself can automatically detect and download the position (URL) of the script file for proxy setting so as to perform the setting. Note that, WPAD includes a method implemented in general, of searching for an entry having the name "wpad" with a method using the DHCPINFORM message of the DHCP server and a method using the Domain Name System (DNS), and then downloading the proxy setting script from the entry.

The similar method can be used for discovering the master proxy 111 operating on the master proxy device 10M. The present technology proposes a method in which the client device 20 discovers in the network 30 the master proxy device 10M on which the master proxy 111 is operating, and then obtains an IP address and a port number (hereinafter referred to as a proxy listening address/port) used in the listening by the master proxy 111 for a request.

For that purpose, the client device 20 needs to recognize the Web API for inquiring the proxy listening address/port to the master proxy 111. That is, this Web API can be defined as an interface for calling services.

Here, in a case where Universal Plug and Play (UPnP) is used for discovering the master proxy 111, SSDP is used for finding the master proxy 111 and disclosing the function.

SSDP typically uses XML format files describing functions and information that devices can provide as device descriptions to be exchanged when services to be disclosed are discovered. This file describes a device description that describes a target device itself and a service description as an action of each of services implemented on the target device.

The present technology enables description of the URL of the Web API that returns the IP address and port number (proxy listening address/port) used for the listening by the master proxy 111 for the request in the description (for example, service description) of the master proxy 111.

In addition, the present technology adds a protocol for discovering the service of the master proxy 111 corresponding to the broadcasting service such as the ATSC 3.0 service, making it possible to set proxy listening address/port as a proxy for the browser 212 on the general client device 20 not implementing the broadcasting service.

That is, when a certain script (Web API) is launched by the browser 212 of a general client device 20 (a general end device such as a smartphone or a tablet computer) not implementing the broadcasting service, the present technology is configured to discover the master proxy device 10M being the server corresponding to the broadcasting service, making it possible to set the proxy listening address/port of the master proxy 111 operating on the device as the proxy of the browser 212.

Hereinafter, a sequence of discovering the master proxy 111 operating on the master proxy device 10M and obtaining the proxy listening address/port of the master proxy 111 (proxy discovery and connection processing) will be described.

Note that while SSDP has been described herein as an example as a protocol for searching and responding to devices on the network, it is also possible to achieve the similar function by using another protocol such as Discovery and Launch (DIAL). DIAL is a protocol that discovers DIAL compatible devices on the network by UPnP and activates a specified application.

(Master Proxy Setting Processing)

Figure 18:
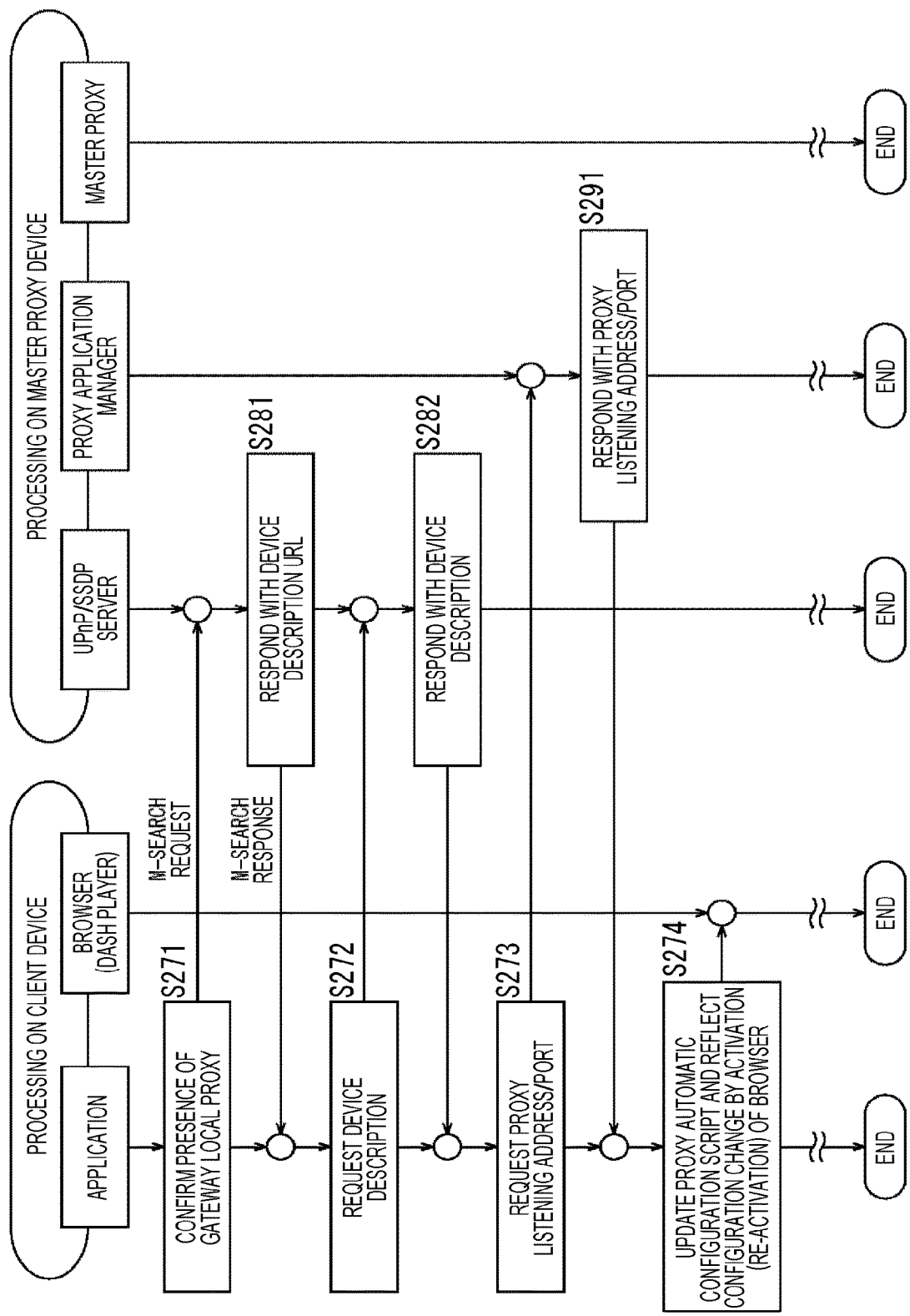
FIG. 18 is a flowchart illustrating a flow of a master proxy setting processing.

FIG. 18 is a flowchart illustrating a flow of the master proxy setting processing corresponding to the processing of step S102 in FIG. 8.

Note that in the description of FIG. 18, it is assumed that "192.168.1.1" is assigned as the IP address to the master proxy device 10M connected to the network 30. Furthermore, among the services operating on this master proxy device 10M, port number of "12345" is assumed to be assigned to the UPnP/SSDP server 112 while port number of "23456" is assumed to be assigned to the proxy application manager 113, and port number of "34567" is assumed to be assigned to the master proxy 111.

Furthermore, in FIG. 18, the processing of steps S281 to S282 and the processing of step S291 are executed by the master proxy device 10M. Along with this, the processing of steps S271 to S274 is executed by the client device 20.

In step S271, in order to confirm the existence of the master proxy 111 operating on the master proxy device 10M, the application 211 transmits an M-SEARCH request in multicast transmission to the device (server) connected to the network 30, via the communication I/F 201.

In the processing of step S271, the M-SEARCH request transmitted from the client device 20 is received by the master proxy device 10M via the network 30.

In step S281, the UPnP/SSDP server 112 generates a device description URL in response to the M-SEARCH request received from the client device 20, and transmits the generated URL as the M-SEARCH response to the client device 20 via the network 30.

In the processing of step S281, the M-SEARCH response transmitted by the master proxy device 10M is received by the client device 20 that has transmitted the M-SEARCH request.

In step S272, the application 211 requests the UPnP/SSDP server 112 for a device description on the basis of the M-SEARCH response (specifically, device description URL of the response) received from the master proxy device 10M.

In the processing of step S272, the device description request transmitted from the client device 20 is received by the master proxy device 10M via the network 30.

In step S282, the UPnP/SSDP server 112 (local web server 114) generates a device description in response to the device description request received from the client device 20, and transmits the generated device description to the client device 20 via the network 30 as a response.

As illustrated in FIG. 10, this device description response describes content of the first service element out of the two service elements described in the serviceList element.

That is, the serviceType element describes "urn:atsc: proxy" as the service type, which means that it is a proxy service of the ATSC 3.0 service. Furthermore, the serviceId element has a description of "urn:UPnP:serviceId:1234" as the service ID, representing a service ID of the proxy service.

Moreover, the controlURL element has a description of "http://192.168.1.1:23456/getATSC3.0ProxyAddressPort" as an URL of the proxy listening address/port acquisition Web API. This URL is information for calling up the Web API for obtaining the proxy listening address/port indicating the IP address and port number at which the master proxy 111 listens for a request.

In the processing of step S282, the device description response transmitted by the master proxy device 10M is received by the client device 20 that has transmitted the device description request.

In step S273, the application 211 request the proxy application manager 113 for a proxy listening address/port on the basis of the device description response (specifically, URL of the proxy listening address/port acquisition Web API) received from the master proxy device 10M.

FIG. 19 is a diagram illustrating an example of a proxy listening address/port request.

The proxy listening address/port request describes a target proxy listening address/port being "getATSC 3.0ProxyAddressPort" as the target resource of the GET method. Furthermore, HOST includes description of "192.168.1.1:23456" as a host name.

That is, in the proxy listening address/port request, the target of the GET method corresponds to "getATSC 3.0ProxyAddressPort" in accordance with the content (content of controlURL element) described in the device description response. Furthermore, the IP address of the master proxy device 10M, that is "192.168.1.1" and the port number of the proxy application manager 113, which is "23456" are described as HOST in the proxy listening address/port request.

Returning to FIG. 18, in the processing of step S273, the proxy listening address/port request transmitted from the client device 20 is received by the master proxy device 10M via the network 30.

In step S291, the proxy application manager 113 generates a proxy listening address/port in response to the proxy listening address/port request received from the client device 20, and transmits the generated proxy listening address/port to the client device 20 via the network 30 as a response.

FIG. 20 is a diagram illustrating an example of the proxy listening address/port response.

"192.168.1.1:34567" is described as the proxy listening address/port in the body portion of the proxy listening address/port response.

That is, in the master proxy device 10M, "192.168.1.1" being the IP address assigned to the master proxy device 10M and "34567" being the port number assigned to the master proxy 111" are described in the body portion of the response.

Note that while this example describes that the proxy application manager 113 receives a request (proxy listening address/port request) to the Web API, the main body of the master proxy 111 may receive and process the request.

Returning to FIG. 18, in the processing of step S291, the proxy listening address/port response transmitted by the master proxy device 10M is received by the client device 20 that transmitted the proxy listening address/port request.

In step S274, the application 211 updates the proxy automatic configuration script and reflection of configuration change by activating (re-activating) the browser 212 on the basis of the proxy listening address/port response (IP address and port number) received from the master proxy device 10M.

In the client device 20, the application 211 rewrites the proxy automatic configuration script file by using the IP address and port number (ATSC3.0ProxyAddressPort (192.168.1.1:34567)) obtained as the proxy listening address/port from the proxy listening address/port response.

That is, the proxy automatic configuration script file is rewritten by the application 211 by the proxy listening address/port, and the browser 212 is activated (re-activated) in the client device 20. Subsequently, the setting (automatic setting) of the IP address and port number of the master proxy 111 is performed by the proxy automatic configuration script file referred to by the browser 212.

This enables the browser 212 in the client device 20 to access the master proxy 111 operating on the master proxy device 10M via the network 30.

The flow of the master proxy setting processing has been described above.

4. Implementation Example of Master Proxy and Slave Proxy

First, details of the policy (rule) when the master proxy 111 determines the service coverage range will be described.

(1) Example of Automatic Assignment of Service Coverage Range

Figure 21:
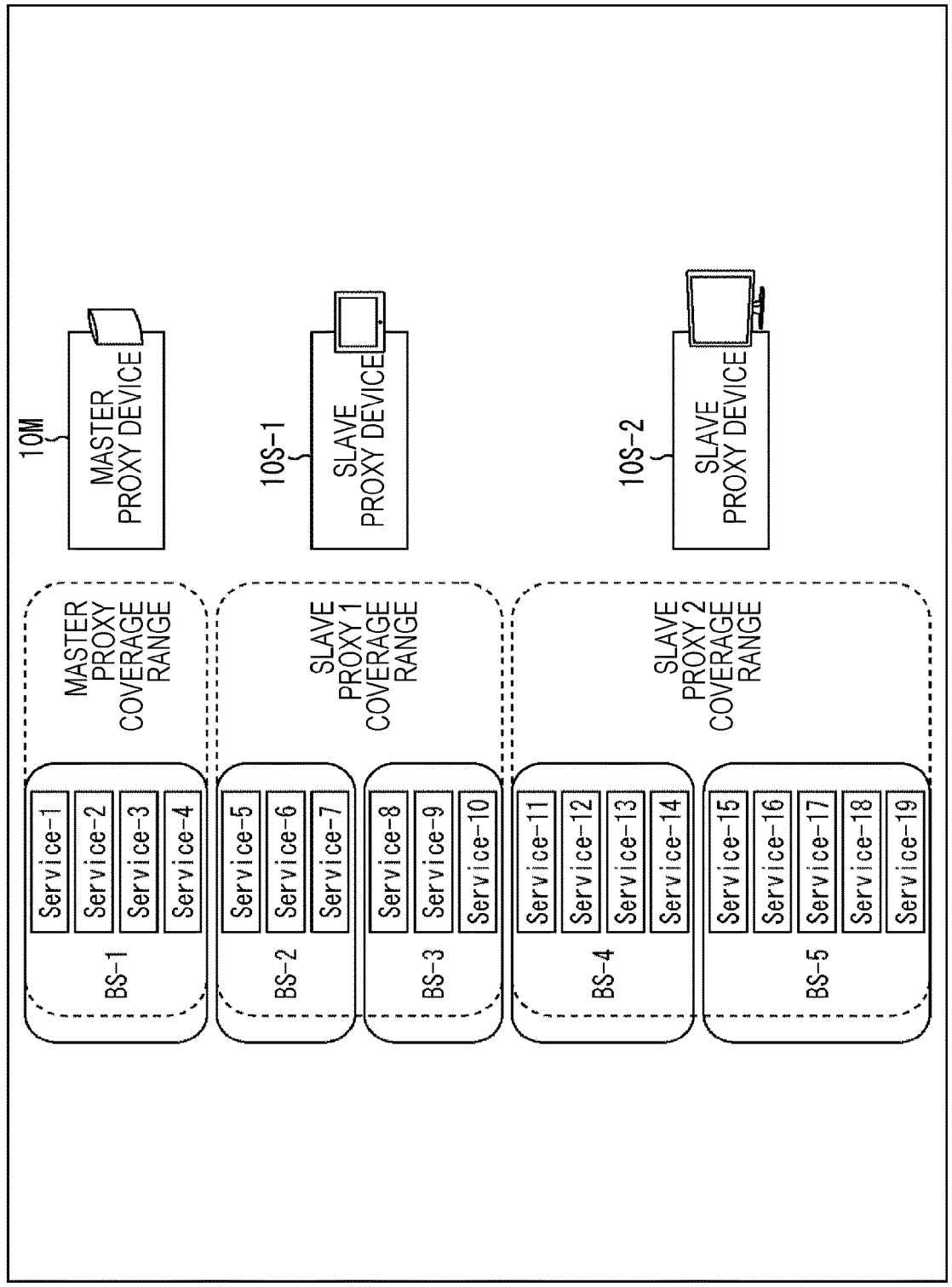
FIG. 21 is a diagram illustrating an example of automatic assignment of a service coverage range.

FIG. 21 is a diagram illustrating an example of automatic service coverage range assignment.

FIG. 21 assumes that 19 services of Services 1 to 19 are scanned as services receivable by the master proxy device 10M and the slave proxy devices 10S-1 and 10S-2.

Streams of Services 1 to 4 are transmitted in the broadcast stream 1 (BS-1). Furthermore, streams of Services 5 to 7 are transmitted in the broadcast stream 2 (BS-2). Furthermore, streams of Services 8 to 10 are transmitted in the broadcast stream 3 (BS-3).

Furthermore, streams of Services 11 to 14 are transmitted in the broadcast stream 4 (BS-4). Furthermore, streams of Services 15 to 19 are transmitted in the broadcast stream 5 (BS-5).

On the basis of these service scan results and in accordance with a predetermined policy, the master proxy 111 operating on the master proxy device 10M determines the service coverage range covered by the master proxy 111 and the slave proxies 161-1 and 161-2.

In the example of FIG. 21, a service coverage range is automatically assigned to each of the master proxy 111 and the slave proxies 161-1 and 161-2 in units of broadcast streams (for example, a unit of a frequency band of 6 MHz).

That is, among the scanned broadcasting services, Services 1 to 4 of the broadcast stream 1 (BS-1) are assigned to the service coverage range of the master proxy 111. Furthermore, Services 5 to 7 of the broadcast stream 2 (BS-2) and Services 8 to 10 of the broadcast stream 3 (BS-3) are assigned to the service coverage range of the slave proxy 161-1.

Furthermore, Services 11 to 14 of the broadcast stream 4 (BS-4) and Services 15 to 19 of the broadcast stream 5 (BS-5) are assigned to the service coverage range of the slave proxy 161-2.

Note that while the example of FIG. 21 is an example in which the service coverage range is automatically assigned in units of broadcast streams, the unit for automatically assigning a service coverage range is not limited to a broadcast stream unit and may be other units such as service unit, for example.

In this manner, as a policy when the master proxy 111 determines the service coverage range, it is possible to use a rule of automatically assigning service coverage range to the master proxy 111 and the slave proxy 161 in a predetermined unit such as a broadcast stream unit or a service unit.

Figure 22:
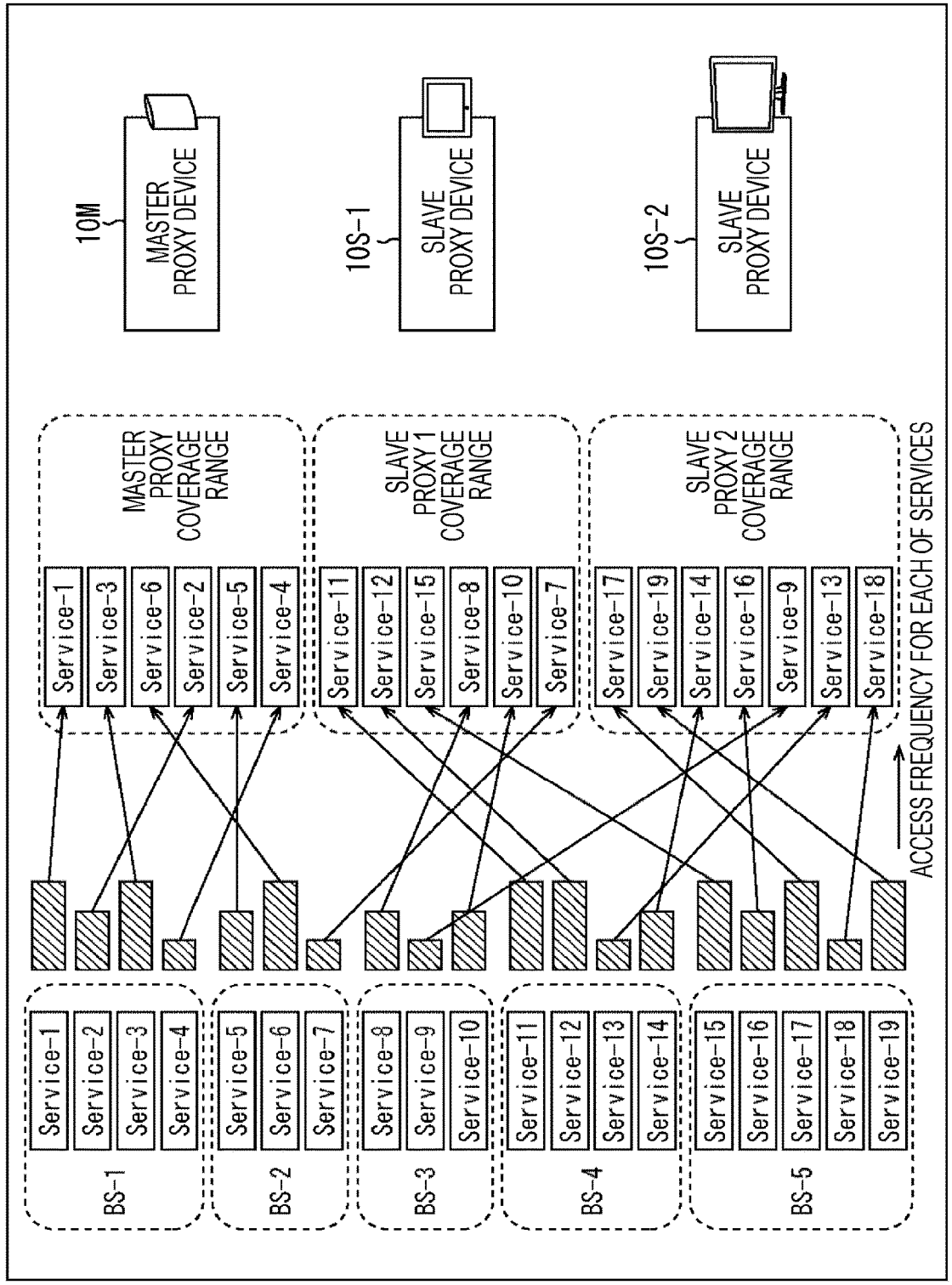
FIG. 22 is a diagram illustrating an example of assignment of a coverage range according to access frequency of a service.

(2) Example of Assignment of Coverage Range According to Access Frequency of Service FIG. 22 is a diagram illustrating an example of assignment of a coverage range according to access frequency of a service.

Similarly to FIG. 21, FIG. 22 assumes that 19 services of Services 1 to 19 are scanned as services receivable by the master proxy device 10M and the slave proxy devices 10S-1 and 10S-2. Furthermore, the stream of the service transmitted in each of broadcast streams is similar to the stream in FIG. 21.

On the basis of these service scan results and in accordance with a predetermined policy, the master proxy 111 operating on the master proxy device 10M determines the service coverage range covered by the master proxy 111 and the slave proxies 161-1 and 161-2.

In the example of FIG. 22, service coverage ranges are assigned to the master proxy 111 and the slave proxies 161-1 and 161-2 in consideration of the viewing history of the content of the end user.

Here, FIG. 22 illustrates a graph (hatched square in the figure) indicating access frequency for each of services. This indicates that the wider the lateral length of the service in the graph in the figure, the higher the access frequency of the service. For example, in the broadcast stream 1 (BS-1), the access frequency of Services 1 and 3 is high, while the access frequency of Service 4 is low. Furthermore, the access frequency of Service 2 is an intermediate frequency of these services.

In consideration of the access frequency for each of services as described above, Services 1 to 4 of the broadcast stream 1 (BS-1) and Services 5 and 6 of the broadcast stream 2 (BS-2) among the scanned broadcasting services are assigned to the service coverage range of the master proxy 111.

Furthermore, Service 7 of the broadcast stream 2 (BS-2), Services 8 and 10 of the broadcast stream 3 (BS-3), Services 11 and 12 of the broadcast stream 4 (BS-4), and Service 15 of the broadcast stream 5 (BS-5) are assigned to the service coverage range of the slave proxy 161-1.

Furthermore, Service 9 of the broadcast stream 3 (BS-3), Services 13 and 14 of the broadcast stream 4 (BS-4), and Services 16 to 19 of the broadcast stream 5 (BS-5) are assigned to the service coverage range of the slave proxy 161-2.

In this example, services with high access frequency, such as Services 1 and 3 of the broadcast stream 1, Service 6 of the broadcast stream 2, Services 11 and 12 of the broadcast stream 4, and Services 15, 17, and 19 of the broadcast stream 5, are substantially equally assigned to the master proxy 111 and the slave proxies 161-1 and 161-2, achieving load balancing according to the access frequency of the service.

In this manner, as a policy when the master proxy 111 determines the service coverage range, it is possible to use a rule of assigning service coverage range such that a service having a higher access frequency can achieve load balancing with higher priority in the master proxy 111 and the slave proxy 161.

Figure 23:
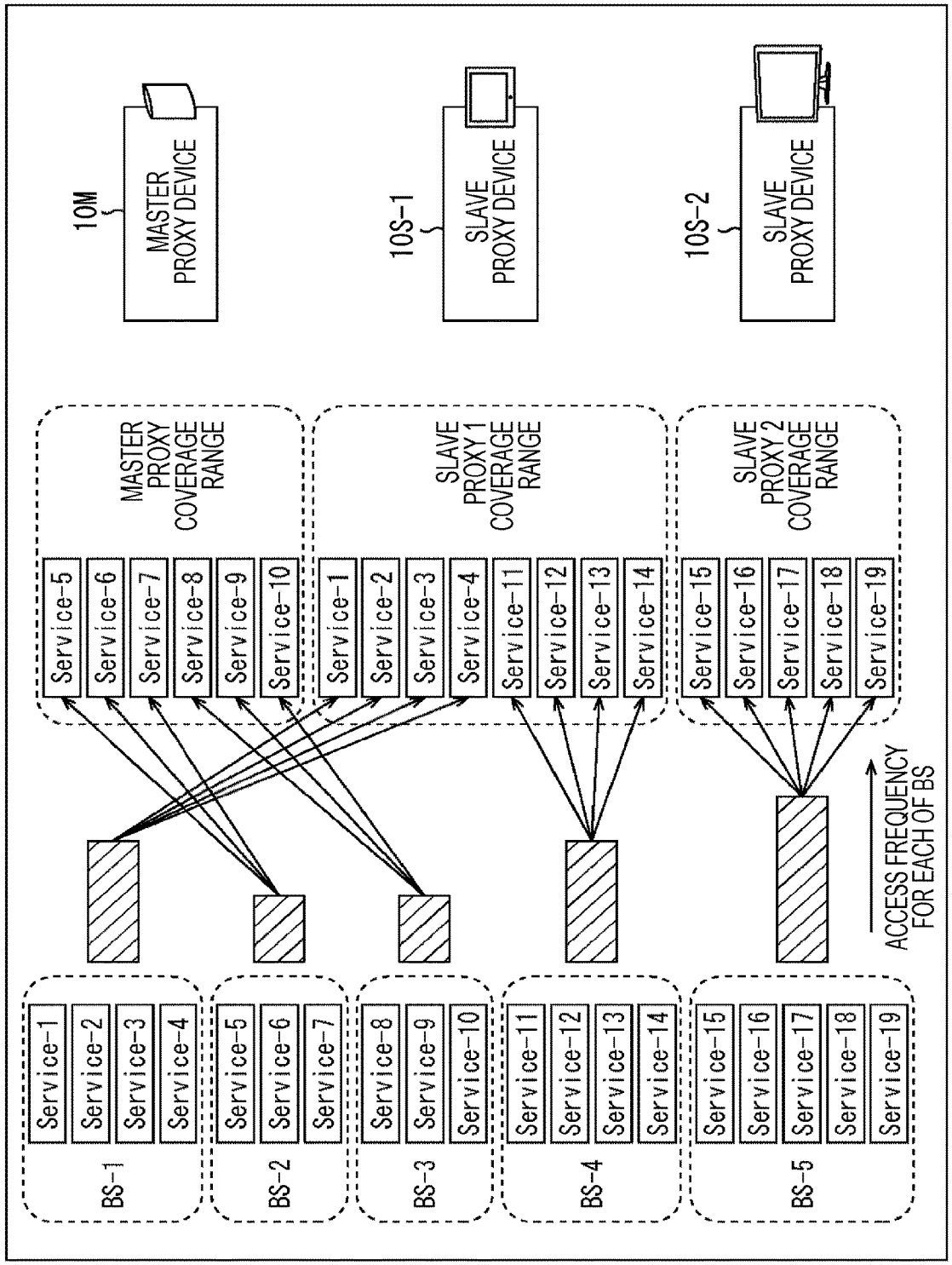
FIG. 23 is a diagram illustrating an example of assignment of coverage ranges for each of BS according to the access frequency of a service.

(3) Example of Assignment of Coverage Range for Each of BS According to Access Frequency of Service FIG. 23 is a diagram illustrating an example of assignment of coverage ranges for each of broadcast streams (BS) according to the access frequency of the service.

Similarly to FIGS. 21 and 22, FIG. 23 also assumes that 19 services of Services 1 to 19 are scanned as services receivable by the master proxy device 10M and the slave proxy devices 10S-1 and 10S-2. Furthermore, the stream of the service transmitted in each of broadcast streams is similar to the stream in FIGS. 21 and 22.

On the basis of these service scan results and in accordance with a predetermined policy, the master proxy 111 operating on the master proxy device 10M determines the service coverage range covered by the master proxy 111 and the slave proxies 161-1 and 161-2.

In the example of FIG. 23, service coverage ranges are assigned to the master proxy 111 and the slave proxies 161-1 and 161-2 in consideration of the viewing history of the content of the end user.

Here, FIG. 23 illustrates a graph (hatched square in the figure) indicating access frequency (sum of access frequencies of services) for each of broadcast streams (BS). This indicates that the wider the lateral length of the broadcast stream in the graph in the figure, the higher the access frequency of the broadcast stream. For example, among the broadcast streams 1 (BS-1) to 5 (BS-5), the broadcast stream 5 has the highest access frequency, and the access frequency decreases in the descending order of the broadcast streams 1, 4, 2, and 3.

In consideration of the access frequency for each of broadcast streams as described above, Services 5 to 7 of the broadcast stream 2 (BS-2) and Services 8 to 10 of the broadcast stream 3 (BS-3) among the scanned broadcasting services are assigned to the service coverage range of the master proxy 111.

Furthermore, Services 1 to 4 of the broadcast stream 1 (BS-1) and Services 11 to 14 of the broadcast stream 4 (BS-4) are assigned to the service coverage range of the slave proxy 161-1. Furthermore, Services 15 to 19 of the broadcast stream 5 (BS-5) are assigned to the service coverage range of the slave proxy 161-2.

In this example, the broadcast stream 5 with the highest access frequency is uniquely assigned to the slave proxy 161-2 with the remaining broadcast streams 1 to 4 being assigned substantially equally to the master proxy 111 and the slave proxy 161-1, achieving the load balancing according to the access frequency of the broadcast stream.

In this manner, as a policy when the master proxy 111 determines the service coverage range, it is possible to use a rule of assigning service coverage range such that a broadcast stream having higher access frequency can achieve load balancing with higher priority in the master proxy 111 and the slave proxy 161.

In other words, since stream data of a service group transmitted within a broadcast stream of the same broadcast stream ID can be simultaneously processed (obtained), with the execution of load balancing according to the access frequency of the broadcast stream, it is possible to integrate services capable of simultaneously obtaining stream data. Subsequently, by integrating the service groups capable of simultaneously obtaining stream data, it is possible to increase the speed of channel zapping, for example.

Figure 24:
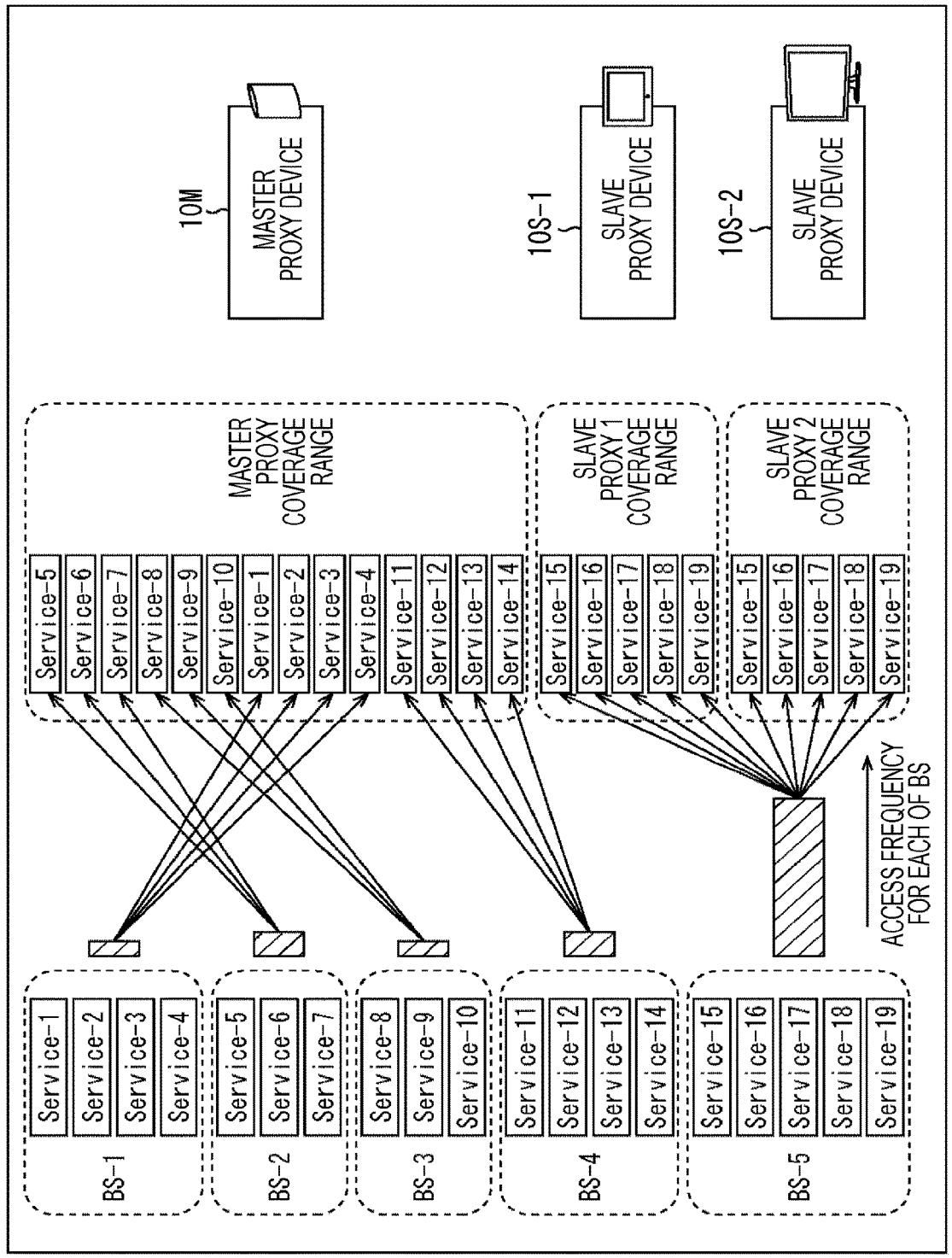
FIG. 24 is a diagram illustrating an example of assignment of coverage ranges for each of BS according to access frequency of a service.

Furthermore, for example, as illustrated in FIG. 24, in a case where access frequency of a specific broadcast stream is extremely high, it is allowable to configure such that appropriate load balancing corresponding to the access frequency may be performed.

In this example, the broadcast stream 5 with extremely high access frequency is assigned to the slave proxy 161-1 and the slave proxy 161-2 (specifically, two FW proxy devices 10 including the proxies) while the remaining broadcast streams 1 to 4 being assigned to the master proxy 111. This configuration makes it possible to achieve appropriate load balancing even in a case where the access frequency of a specific broadcast stream is extremely high.

The above has described the policies for determining the service coverage range. However, these policies are mere examples, and another policy may be used as long as it is a rule that can assign a service coverage range capable of performing optimum load balancing.

Furthermore, which policy to use out of these policies can be set by the end user. For example, by allowing the setting screen of the policy to be presented on the FW proxy device 10, the client device 20, or the like, the end user can operate (a user interface (UI)) of the setting screen to set a desired policy. Note that the setting of the policy is not limited to the operation by the end user, but may be set, for example, by using a method such as machine learning accumulating past data.

Note that in a case where each of the FW proxy devices 10 is located close to each other, the service scan results for each of the FW proxy devices 10 are likely to be the same. However, each of the FW proxy devices 10 might exist at a distant location from each other depending on the operation. In such a case, there is a possibility that the service scan results for each of the FW proxy devices 10 might not be the same. Accordingly, such a positional relationship may be taken into consideration.

Furthermore, the content viewing history information of the end user may be managed either by the master proxy device 10M, or the slave proxy device 10S, or a dedicated server (viewing history server) installed. In a case where a server other than the master proxy device 10M manages the viewing history, the master proxy 111 obtains the viewing history information from another server connected to the network 30 at determination of the service coverage range.

Furthermore, while the above description is an example in which the service coverage range is also assigned to the master proxy 111, it is allowable to configure not to assign the service coverage range to the master proxy 111, and to configure to allow the master proxy 111 to perform assignment processing of the service coverage range, the request redirection processing, and the like alone. In this case, the master proxy device 10M in which the master proxy 111 operates does not have necessity of receiving content streams. Accordingly, it is possible to use a device such as a dedicated server without a tuner.

(4) Example of Topology of Master Proxy and Slave Proxy

Next, with reference to FIGS. 25 and 26, a topology (connection mode) of the FW proxy device 10 and the client device 20 connected to the network 30 will be described.

(Topology in Home LAN, Etc.)

Figure 25:
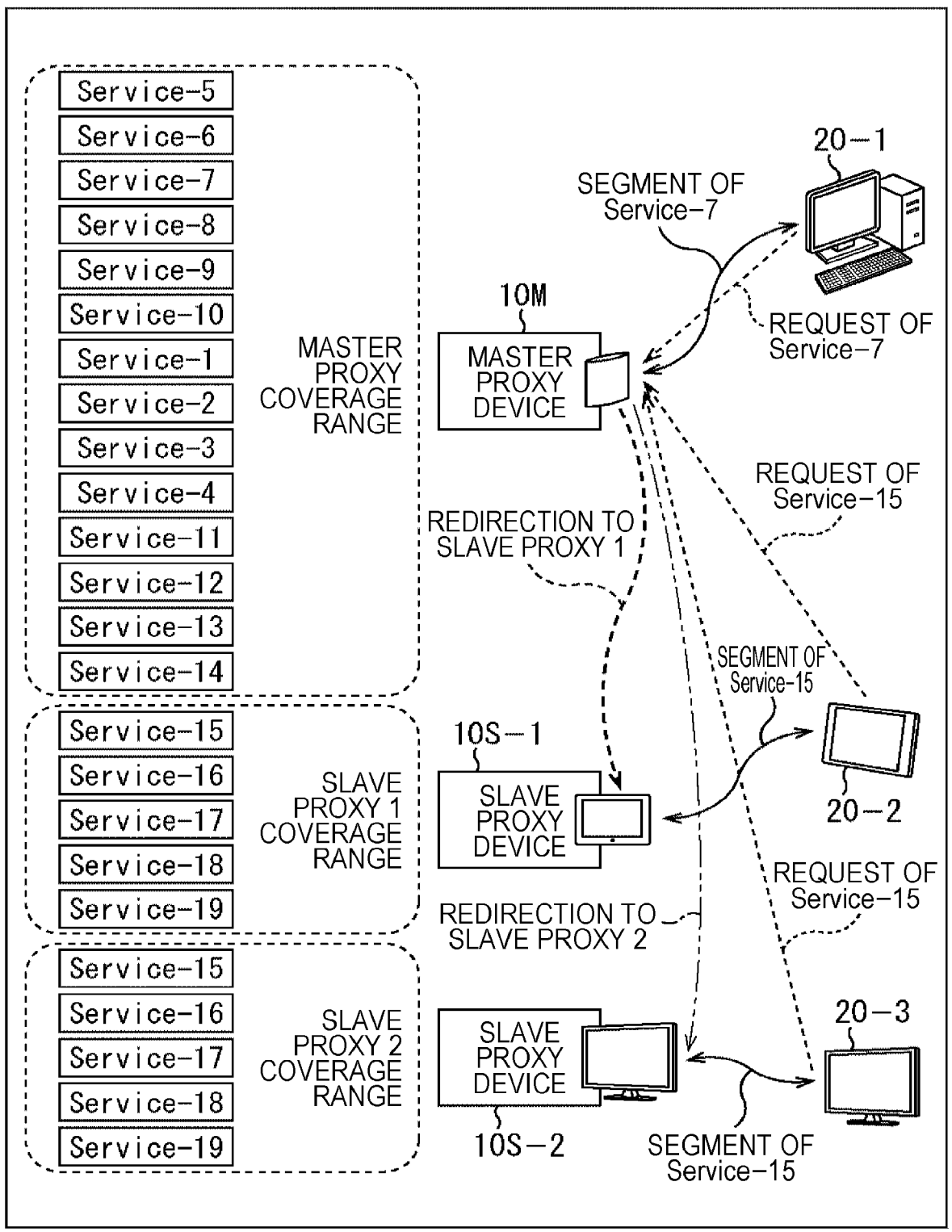

FIG. 25 is a diagram illustrating an example of a topology in a case where the network 30 is a home LAN or the like.

In FIG. 25, the network 30 such as a home LAN within the end user's home 2 is connected with the master proxy device 10M, the slave proxy device 10S-1, the slave proxy device 10S-2, the client device 20-1, the client device 20-2, and the client device 20-3.

Furthermore, the master proxy 111 operating on the master proxy device 10M assigns a service coverage range for each of the slave proxy 161-1 operating on the slave proxy device 10S-1 and the slave proxy 161-2 operating on the slave proxy device 10S-2.

That is, Services 1 to 14 are assigned to the master proxy 111 as a service coverage range. Similarly, Services 15 to 19 are assigned to the slave proxy 161-1 and Services 15 to 19 are assigned to the slave proxy 161-2, as service coverage ranges. Note that the assignment of this service coverage range is similar to the assignment according to the access frequency for each of broadcast streams illustrated in FIG. 24.

Here, in a case where an instruction on reproduction of the content distributed by Service 7 is given on the client device 20-1, the DASH segment request of Service 7 is transmitted to the master proxy device 10M. The master proxy 111 refers to the proxy service coverage range database and determines that the master proxy 111 oneself is to cover the DASH segment request of Service 7.

Subsequently, the master proxy device 10M processes the DASH segment file of Service 7 distributed via broadcasting and transmits the processed file to the client device 20-1. This enables the client device 20-1 to reproduce the content distributed by Service 7.

Furthermore, in a case where the instruction on reproduction of the content distributed by Service 15 is given on the client device 20-2, the DASH segment request of Service 15 is transmitted to the master proxy device 10M. The master proxy 111 refers to the proxy service coverage range database and determines that the slave proxy 161-1 (or the slave proxy 161-2) is to cover the DASH segment request of Service 15.

Subsequently, the master proxy 111 redirects the DASH segment request of Service 15 to the slave proxy 161-1. The slave proxy device 10S-1 processes the DASH segment file of Service 15 distributed via broadcasting and transmits the processed file to the client device 20-2. This enables the client device 20-2 to reproduce the content distributed by Service 15.

Furthermore, in a case where the instruction on reproduction of the content distributed by Service 15 is given on the client device 20-3, the DASH segment request of Service 15 is transmitted to the master proxy device 10M. The master proxy 111 refers to the proxy service coverage range database and determines that the slave proxy 161-2 (or the slave proxy 161-1) is to cover the DASH segment request of Service 15.

Subsequently, the master proxy 111 redirects the DASH segment request of Service 15 to the slave proxy 161-2. The slave proxy device 10S-2 processes the DASH segment file of Service 15 distributed via broadcasting and transmits the processed file to the client device 20-3. This enables the client device 20-3 to reproduce the content distributed by Service 15.

Note that while FIG. 25 is an exemplary case where the network 30 is a home LAN in the end user's home 2, it is also allowable, as described above, to install the master proxy device 10M and the slave proxy devices 10S-1 and 10S-2 at locations such as a head end of a cable operator and a base station of a mobile network, for example so as to cover regions in wider range (wider range LAN segment).

That is, for example, in a case where the master proxy device 10M and the slave proxy devices 10S-1 and 10S-2 are installed in the head end of the cable operator, the client devices 20-1 to 20-3 such as a television receiver and a personal computer would be installed in each of end user's premises contracting cable television service, not inside a same end user's home.

Furthermore, for example, in a case where the master proxy device 10M and the slave proxy devices 10S-1 and 10S-2 are installed in a base station of the mobile network, the client devices 20-1 to 20-3 such as smartphones and tablet computers are devices possessed indoors or outdoors by an end user contracting a mobile service.

(Topology in Inter-Vehicle Communication)

Figure 26:
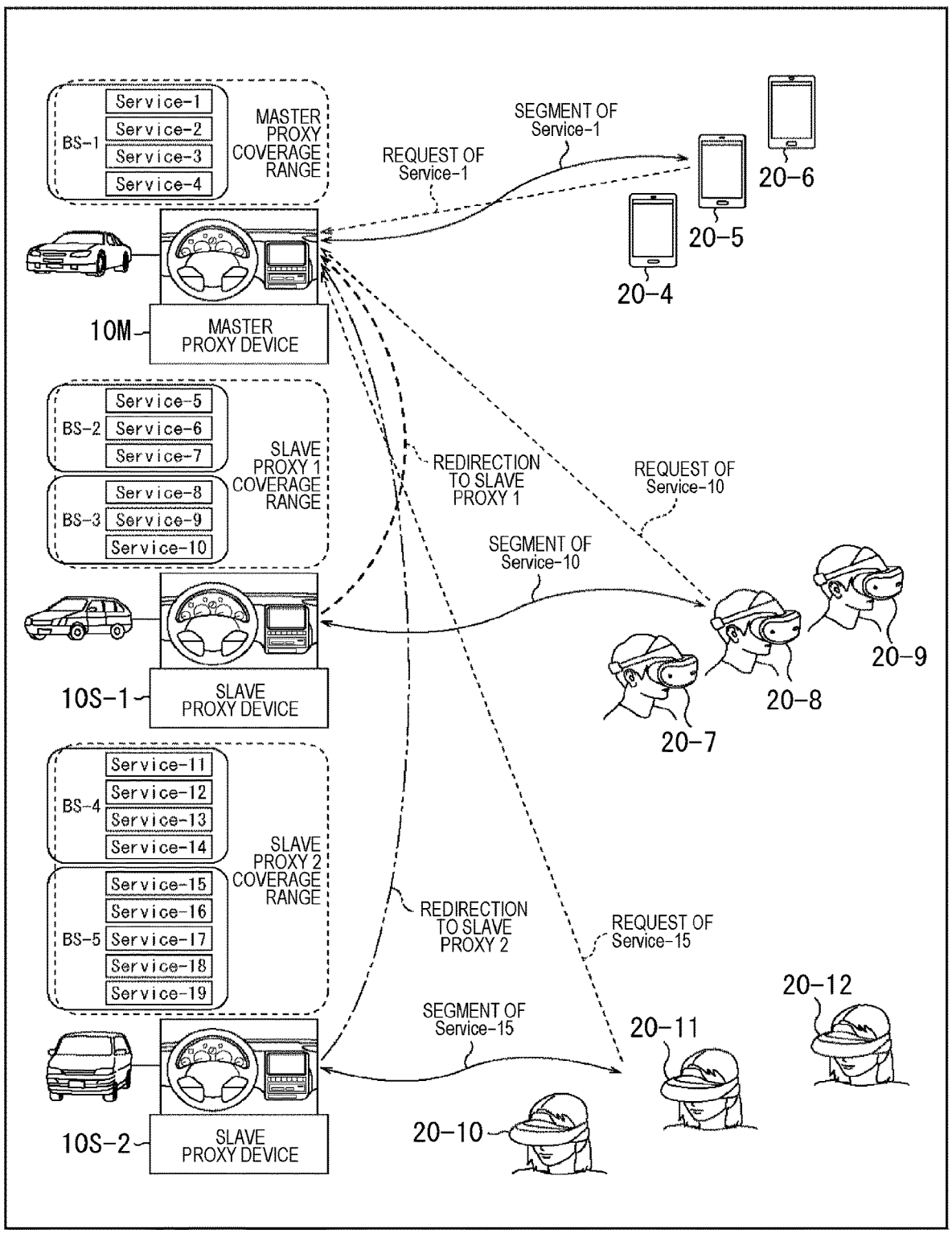
FIG. 26 is a diagram illustrating an example of a topology in a case where the network is wireless communication between vehicles.

FIG. 26 is a diagram illustrating an example of a topology in a case where the network 30 is wireless communication between vehicles.

In FIG. 26, the network 30 on inter-automobile wireless communication is connected with the master proxy device 10M, the slave proxy device 10S-1, and the slave proxy device 10S-2, as in-vehicle devices mounted on each of automobiles. In addition, this network 30 is further connected with client devices 20-4 to 20-12 such as a smartphone and a head-mounted display, which are possessed by the end user.

Note that such a situation is, for example, an assumable case where a large number of automobiles are parked in a parking lot of an event venue and a participant of the event possesses a device, or the like.

Furthermore, the master proxy 111 operating on the master proxy device 10M inside a certain automobile assigns a service coverage range for each of the slave proxy 161-1 operating on the slave proxy device 10S-1 inside another automobile and for the slave proxy 161-2 operating on the slave proxy device 10S-2 inside still another automobile.

That is, Services 1 to 4 are assigned to the master proxy 111 as a service coverage range. Similarly, Services 5 to 10 are assigned to the slave proxy 161-1 and Services 11 to 19 are assigned to the slave proxy 161-2, as service coverage ranges.

Here, in a case where an instruction on reproduction of the content distributed by Service 1 is given on the client device 20-5, the DASH segment request of Service 1 is transmitted to the master proxy device 10M. The master proxy 111 refers to the proxy service coverage range database and determines that the master proxy 111 oneself is to cover the DASH segment request of Service 1.

Subsequently, the master proxy device 10M processes the DASH segment file of Service 1 distributed via broadcasting and transmits the processed file to the client device 20-5. This enables the client device 20-5 to reproduce the content distributed by Service 1.

Furthermore, in a case where the instruction on reproduction of the content distributed by Service 10 is given on the client device 20-8, the DASH segment request of Service 10 is transmitted to the master proxy device 10M. The master proxy 111 refers to the proxy service coverage range database and determines that the slave proxy 161-1 is to cover the DASH segment request of Service 10.

Subsequently, the master proxy 111 redirects the DASH segment request of Service 10 to the slave proxy 161-1. The slave proxy device 10S-1 processes the DASH segment file of Service 10 distributed via broadcasting and transmits the processed file to the client device 20-8. This enables the client device 20-8 to reproduce the content distributed by Service 10.

Furthermore, in a case where the instruction on reproduction of the content distributed by Service 15 is given on the client device 20-11, the DASH segment request of Service 15 is transmitted to the master proxy device 10M. The master proxy 111 refers to the proxy service coverage range database and determines that the slave proxy 161-2 is to cover the DASH segment request of Service 15.

Subsequently, the master proxy 111 redirects the DASH segment request of Service 15 to the slave proxy 161-2. The slave proxy device 10S-2 processes the DASH segment file of Service 15 distributed via broadcasting and transmits the processed file to the client device 20-11. This enables the client device 20-11 to reproduce the content distributed by Service 15.

The implementation example of the master proxy 111 and the slave proxy 161 has been described above.

5. Modification (Distribution Via Communication)

While the transmission system 1 of FIG. 1 described above is a case where the content stream is distributed via broadcasting using the broadcast transmission line 60, the content stream may be configured to be distributed via communication using a communication transmission line such as the Internet.

Figure 27:
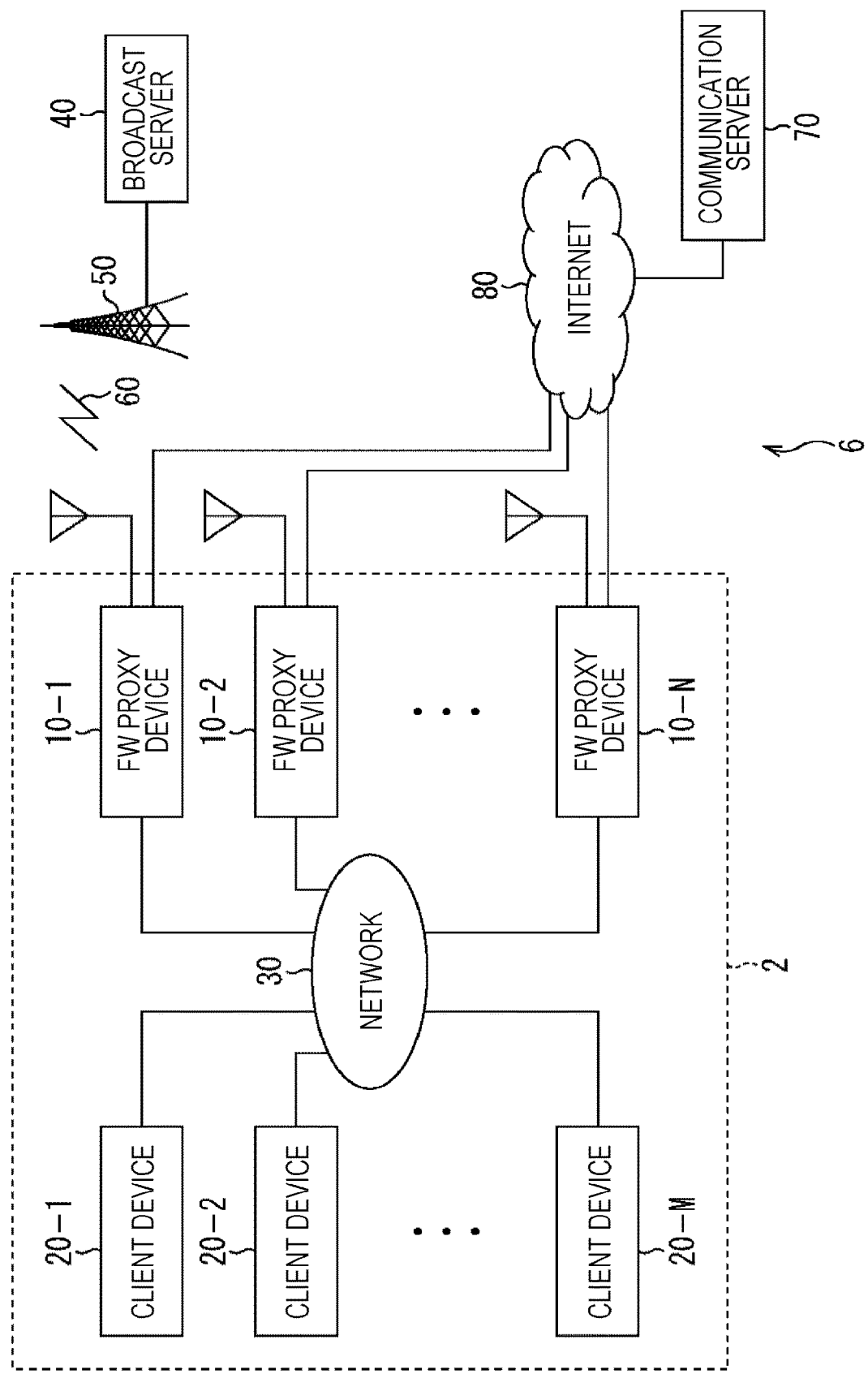
FIG. 27 is a diagram illustrating another exemplary configuration of a transmission system.

FIG. 27 illustrates another configuration example of the transmission system. A transmission system 6 of FIG. 27 differs from the transmission system 1 of FIG. 1 in that a communication system communication server 70 is provided on the transmission side in addition to the broadcast system broadcast server 40.

The FW proxy device 10 also has a communication function (communication I/F (not illustrated)) connectable to Internet 80 together with a receiver function of receiving a broadcast wave transmitted via the broadcast transmission line 60. This enables the FW proxy device 10 to be connected to the communication server 70 via the Internet 80 to communicate with each other.

The FW proxy device 10 transmits a request from the client device 20 connected to the network 30 to the communication server 70 connected to the Internet 80. Furthermore, the FW proxy device 10 receives a content stream transmitted from the communication server 70 via the Internet 80, and transmits (transfers) the stream to the client device 20 connected to the network 30.

As described above, the FW proxy devices 10-1 to 10-N connected to the network 30 have a master-slave relationship such that one of the FW proxy devices 10 functions as a master proxy and the other FW proxy devices 10 function as slave proxies. In addition, the FW proxy devices 10-1 to 10-N have the master-slave relationship, whereby the master proxy device 10M on which a master proxy 111 operates assigns a service coverage range to each of the FW proxy devices 10, as described above.

This configuration enables the client device 20 connected to the network 30 to reproduce the content distributed via broadcasting or communication via the FW proxy device 10 (the master proxy device 10M or the slave proxy device 10S) in accordance with the end user's operation, or the like.

The communication server 70 is, for example, a server provided by a broadcast provider such as a broadcasting station or other providers, so as to be connected to the Internet 80.

In response to a request from the FW proxy device 10, the communication server 70 processing content files and control information such as programs and advertisements, and transmits (in streaming distribution) the resulting data via the Internet 80.

Note that the broadcast server 40 and the communication server 70 may be configured to distribute not only content such as programs, but also applications or the like, for example. In this case, in the transmission system 6, applications are distributed via broadcasting or communication, so as to be received by the client device 20 via the FW proxy device 10.

Furthermore, while the transmission system 1 (FIG. 1) and the transmission system 6 (FIG. 27) that have been described process at least content stream distributed via broadcasting by the FW proxy device 10, it is allowable to provide the communication system communication server 70 alone on the transmission side and cause the FW proxy device 10 to process just the content stream distributed via communication. In this case, the client device 20 reproduces solely the content distributed via communication.

(Application to Other Broadcasting Standards)

While the above description is an example using ATSC (in particular, ATSC 3.0), which is a system adopted in the United States and other countries, as a standard for digital broadcasting, the present technology may be applied to Integrated Services Digital Broadcasting (ISDB) adopted by Japan and other countries, or Digital Video Broadcasting (DVB) adopted by European countries and other countries, or the like. Moreover, while the above description in an example of ATSC 3.0 adopting the IP transmission scheme, the present invention is not limited to the IP transmission scheme and may be applied to other scheme such as the MPEG2 Transport Stream (MPEG2-TS) scheme and the like.

Furthermore, the present technology can be applied to standards of digital broadcasting represented by terrestrial broadcast, and other standards such as satellite broadcasting using a broadcasting satellite (BS) and a communication satellite (CS), and wired broadcasting such as cable television, that is, Common Antenna TeleVision (CATV).

Other Modifications

The terms of control information (signaling or the like) are merely examples, and other terms may be used in some cases. The difference between these names, however, is just a difference in formality, and there is no substantial difference in the control information, packets, or the like, as a target. For example, terms such as User Service Bundle Description (USBD) may be referred to as User Service Description (USD) in some cases. Furthermore, for example, Non Real Time (NRT) may be referred to as Locally Cached Content (LCC) or the like, in some cases.

Furthermore, in addition to applications developed in a markup language such as HyperText Markup Language 5 (HTML 5) or the like and a script language such as JavaScript (registered trademark), the DASH player may also be an application developed by using a programming language such as Java (registered trademark) or the like. Furthermore, this application is not limited to the application executed by browsers, and may be executed as a native application, that is, executed under an operating system (OS) environment, or the like.

Note that the application may also be operated in a non-display state (in the background) (may be activated without being recognized by the end user) in addition to explicitly displaying some information. Furthermore, in addition to moving images and music, the content can include any content such as e-books, games, advertisements, or the like.

6. Computer Configuration

Figure 28:
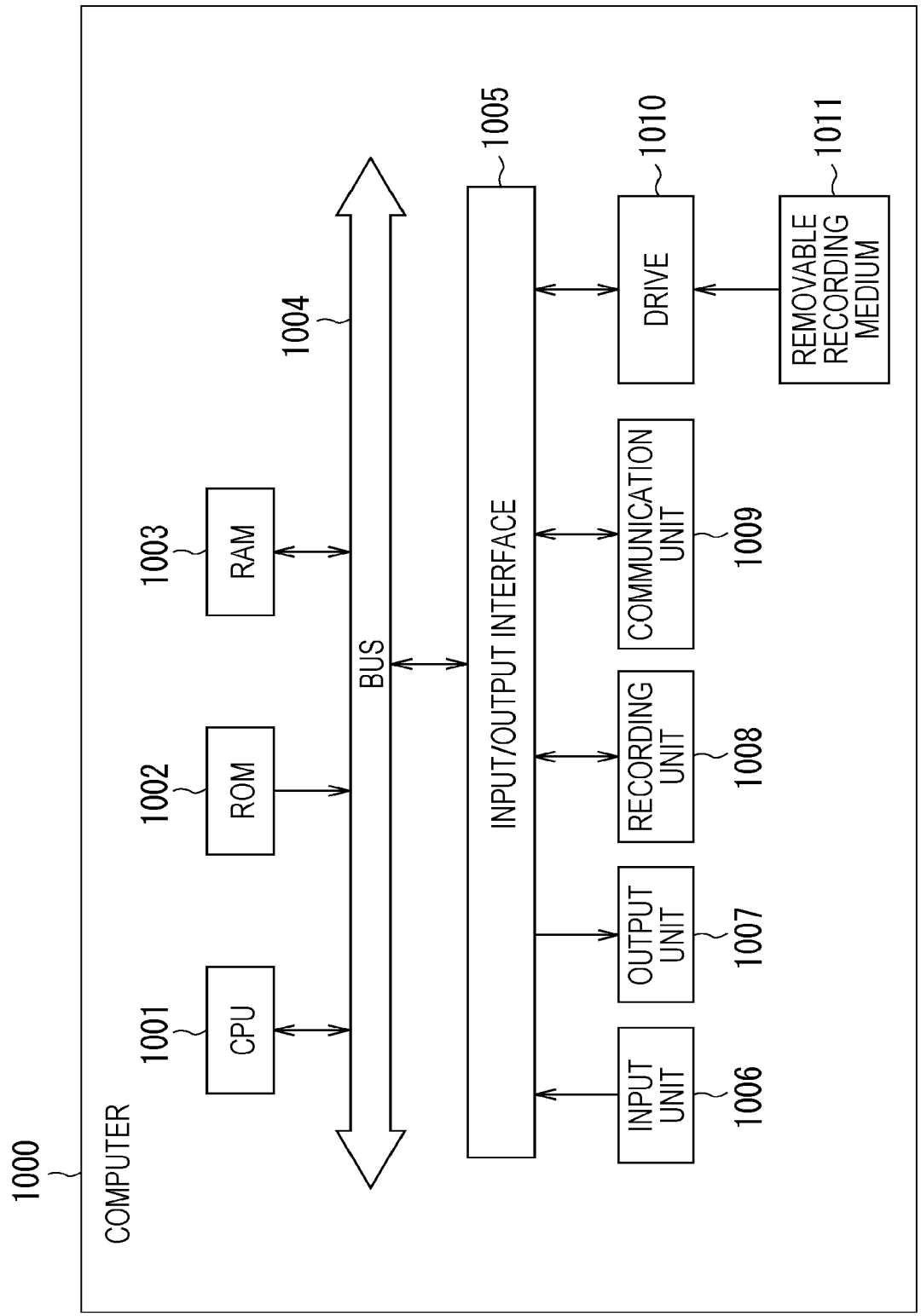
FIG. 28 is a diagram illustrating an exemplary configuration of a computer.

A series of processing described above can be executed in hardware or with software. In a case where the series of processing is executed with software, a program included in the software is installed in a computer. FIG. 28 is a diagram illustrating an exemplary configuration of hardware of a computer that executes the series of processing described above by a program.

In a computer 1000, a central processing unit (CPU) 1001, a read only memory (ROM) 1002, and a random access memory (RAM) 1003 are interconnected via a bus 1004. The bus 1004 is further connected with an input/output interface 1005. The input/output interface 1005 is connected with an input unit 1006, an output unit 1007, a recording unit 1008, a communication unit 1009, and a drive 1010.

The input unit 1006 includes a key board, a mouse, a microphone, or the like. The output unit 1007 includes a display, a speaker, or the like. The recording unit 1008 includes a hard disk, a non-volatile memory, or the like. The communication unit 1009 includes a network interface or the like. The drive 1010 drives a removable recording medium 1011 such as a magnetic disk, an optical disk, a magneto-optical disk, and a semiconductor memory.

On the computer 1000 configured as above, the series of above-described processing is executed by operation such that the CPU 1001 loads, a program stored in the ROM 1002 and the recording unit 1008 onto the RAM 1003 via the input/output interface 1005 and the bus 1004 and executes the program.

The program executed by the computer 1000 (CPU 1001) can be stored, for example, in the removable recording medium 1011 as a package medium or the like and be provided. Alternatively, the program can be provided via a wired or wireless transmission medium including a local area network, the Internet, and digital satellite broadcasting.

On the computer 1000, the program can be installed in the recording unit 1008 via the input/output interface 1005, by attaching the removable recording medium 1011 to the drive 1010. In addition, the program can be received at the communication unit 1009 via a wired or wireless transmission medium and be installed in the recording unit 1008. Alternatively, the program can be installed in the ROM 1002 or the recording unit 1008 beforehand.

Here, in this description, processing executed by a computer in accordance with a program need not be performed in time series in the order described in the flowchart. That is, processing executed by the computer according to the program includes processing executed in parallel or separately (e.g., parallel processing, or object processing). In addition, the program may be processed by one computer (processor) or may be processed with distributed processing by a plurality of computers.

Note that embodiments of the present technology are not limited to the above-described embodiments but can be modified in a variety of ways within a scope of the present technology.

In addition, the present technology can be configured as follows.

(1)

An information processing apparatus that functions as a proxy that receives a content stream distributed for each of a plurality of services and transmits the stream to a client device connected to a network, the proxy being configured to function as a master proxy for a slave proxy, the information processing apparatus including a processing unit that determines a service coverage range corresponding to a predetermined policy, for each of the proxies.

(2)

The information processing apparatus according to (1), in which the processing unit determines the service coverage range corresponding to the policy on the basis of a service scan result indicating a service receivable by the information processing apparatus on which each of the proxies operates.

(3)

The information processing apparatus according to (2), in which the processing unit determines the service coverage range corresponding to the policy on the basis of a capability attribute of the information processing apparatus on which each of the proxies operates.

(4)

The information processing apparatus according to (2) or (3), in which the policy is a rule for assigning the service coverage range to each of the proxies in units of streams or units of services.

(5)

The information processing apparatus according to any of (2) to (4), in which the policy is a rule for assigning the service coverage range on the basis of a content viewing history of an end user.

(6)

The information processing apparatus according to (5), in which the processing unit determines the service coverage range such that a service having higher access frequency can achieve load balancing with higher priority.

(7)

The information processing apparatus according to (5), in which the processing unit determines the service coverage range so as to integrate services capable of simultaneously obtaining data of the content stream.

(8)

The information processing apparatus according to (7), in which the processing unit determines the service coverage range such that a stream having higher access frequency can achieve load balancing with higher priority.

(9)

The information processing apparatus according to any of (2) to (8), in which the processing unit provides notification of, for each of the slave proxies, coverage range information indicating the service covered by each of the slave proxies.

(10)

The information processing apparatus according to (9), in which in a case where an application programming interface (API) for obtaining the coverage range information has been executed by the slave proxy, the processing unit notifies the slave proxy of the coverage range information.

(11)

The information processing apparatus according to any of (1) to (10), in which the processing unit generates a database associating each of the proxies with the service coverage range, and in a case where a service request has been received from the client device, the processing unit refers to the database and performs control to redirect the service request to the proxy that covers the service.

(12)

The information processing apparatus according to any of (1) to (11), in which the policy is set by the end user.

(13)

The information processing apparatus according to any of (1) to (12), in which in a case where an own service coverage range has been determined in each of one information processing apparatus on which the master proxy operates and another information processing apparatus on which the slave proxy operates, preparation for receiving a service corresponding to the own coverage range is performed in each of the information processing apparatuses.

(14)

The information processing apparatus according to any of (1) to (13), in which a plurality of the other information processing apparatuses on which the slave proxy operates is installed on the network.

(15)

The information processing apparatus according to any of (1) to (14), further including a reception unit that receives a broadcast wave, in which the processing unit transmits the content stream distributed via broadcasting to the client device via the network.

(16)

The information processing apparatus according to (15), further including a communication unit that communicates with a server on Internet, in which the processing unit transmits the content stream distributed via communication to the client device via the network.

(17)

An information processing method for an information processing apparatus, the method including:

steps to be performed by the information processing apparatus, of functioning as a proxy that receives a content stream distributed for each of a plurality of services and transmits the content stream to a client device connected to a network, the proxy being configured to function as a master proxy for a slave proxy, and determining a service coverage range corresponding to a predetermined policy, for each of the proxies.

(18)

An information processing system in which a first information processing apparatus on which a master proxy operates, one or more second information processing apparatuses on which a slave proxy operates, and one or more client devices, are mutually connected via a network, in which the first information processing apparatus functions as a proxy that receives a content stream distributed for each of a plurality of services and transmits the content stream to the client device connected to the network, the proxy being configured to function as a master proxy for the slave proxy, the first information processing apparatus including a processing unit that determines a service coverage range corresponding to a predetermined policy, for each of the proxies, and the second information processing apparatus functions as a proxy that receives a content stream distributed for each of a plurality of services and transmits the content stream to the client device connected to the network, the proxy being configured to function as the slave proxy with respect to the master proxy, the second information processing apparatus including a processing unit that processes the content stream distributed by the service corresponding to the coverage range determined by the master proxy.

REFERENCE SIGNS LIST 1, 6 Transmission system
10-1 to 10-M, 10 FW proxy device
10M Master proxy device
10S Slave proxy device
20-1 to 20-M, 20 Client device
30 Network
40 Broadcast server
50 Transmission station
60 Broadcast transmission line
70 Communication server
80 Internet
100 Processing unit
101 Tuner
102 Communication I/F
103 Storage unit
111 Master proxy
112 UPnP/SSDP server
113 Proxy application manager
114 Local web server
115 SLS processing system
150 Processing unit
151 Tuner
152 Communication I/F
153 Storage unit
161 Slave proxy
162 SLS processing system
200 Processing unit
201 Communication I/F
202 Display unit
203 Speaker
211 Application
212 Browser
1000 Computer
1001 CPU

The invention claimed is:

1. An information processing apparatus that functions as a master proxy device, the information processing apparatus comprising:
communication circuitry configured to communicate with a slave proxy device and a client device via a network; and
processing circuitry configured to:
determine a first plurality of broadcasting services receivable by the information processing apparatus;
receive a service scan result from the slave proxy device, the service scan result indicating a second plurality of broadcasting services receivable by the slave proxy device;
determine a first service coverage range of broadcasting services for the information processing apparatus and a second service coverage range of broadcasting services for the slave proxy device according to the first plurality of broadcasting services, the second plurality of broadcasting services, and a predetermined policy; and
distribute a content stream from a requested broadcasting service to the client device via the network in response to a request from the client device in a case that the requested broadcasting service is included in the first service coverage range.

2. The information processing apparatus according to claim 1,
wherein the processing circuitry is configured to determine the first service coverage range and the second service coverage range on a basis of a capability attribute of the information processing apparatus and a capability attribute of the slave proxy device.

3. The information processing apparatus according to claim 1,
wherein the policy is a rule for assigning the first service coverage range and the second service coverage range in units of streams or units of services.

4. The information processing apparatus according to claim 1,
wherein the policy is a rule for assigning the first service coverage range and the second service coverage range on a basis of a content viewing history of an end user.

5. The information processing apparatus according to claim 4,
wherein the processing circuitry is configured to determine the first service coverage range and the second service coverage range such that a service having a higher access frequency is arranged to achieve load balancing with higher priority.

6. The information processing apparatus according to claim 4,
wherein the processing circuitry is configured to determine the first service coverage range and the second service coverage range so as to integrate services capable of simultaneously obtaining data of the content stream.

7. The information processing apparatus according to claim 6,
wherein the processing circuitry is configured to determine the first service coverage range and the second service coverage range such that a stream having a higher access frequency is arranged to achieve load balancing with higher priority.

8. The information processing apparatus according to claim 1,
wherein the processing circuitry is configured to provide notification of, for the slave proxy device, the second coverage range information.

9. The information processing apparatus according to claim 8,
wherein in a case where an application programming interface (API) for obtaining the second coverage range information has been executed by the slave proxy device, the processing circuitry is configured to notify the slave proxy device of the second coverage range information.

10. The information processing apparatus according to claim 1, wherein the processing circuitry is configured to:
generate a database that associates the master proxy device and the slave proxy device with the first service coverage range and the second coverage range, respectively, and
in a case where a service request has been received from the client device, perform control to redirect the service request to a suitable proxy device according to the database.

11. The information processing apparatus according to claim 1,
wherein the policy is set by an end user.

12. The information processing apparatus according to claim 1,
wherein preparation for receiving the requested broadcasting service when the requested broadcasting is included in the first coverage range is performed in the information processing apparatus, and preparation for receiving the requested broadcasting service when the requested broadcasting is included in the second coverage range is performed in the slave proxy device.

13. The information processing apparatus according to claim 1,
wherein of one or more other information processing apparatuses that function as one or more other slave proxy devices are communicatively coupled with the information processing apparatus via the network.

14. The information processing apparatus according to claim 1, further comprising reception circuitry configured to receive a broadcast wave carrying the content stream.

15. The information processing apparatus according to claim 14, wherein the processing circuitry is further configured to receive another content stream from a server via the Internet.

16. An information processing method for an information processing apparatus that functions as a master proxy device and is communicatively coupled with a slave proxy device and a client device via a network, the method comprising:
determining, by processing circuitry of the information processing apparatus, a first plurality of broadcasting services receivable by the information processing apparatus;
receiving, by the processing circuitry of the information processing apparatus, a service scan result from the slave proxy device, the service scan result indicating a second plurality of broadcasting services receivable by the slave proxy device;
determining, by the processing circuitry of the information processing apparatus, a first service coverage range of broadcasting services for the information processing apparatus and a second service coverage range of broadcasting services for the slave proxy device according to the first plurality of broadcasting services, the second plurality of broadcasting services, and a predetermined policy; and
distributing a content stream from a requested broadcasting service to the client device via the network in response to a request from the client device in a case that the requested broadcasting service is included in the first service coverage range.

17. An information processing system, comprising:
a first information processing apparatus configured to function as a master proxy device;
one or more second information processing apparatuses configured to function as one or more slave proxy devices; and
one or more client devices, wherein
the first information processing apparatus, the one or more second information processing apparatuses, and the one or more client devices are communicatively connected via a network,
the first information processing apparatus includes first processing circuitry configured to:
determine a plurality of broadcasting services receivable by the first information processing apparatus;
receive one or more service scan results from the one or more second first information processing apparatuses, the one or more service scan results indicating one or more respective sets of broadcasting services receivable by the one or more second information processing apparatuses;
determine a first service coverage range of broadcasting services for the first information processing apparatus and one or more second service coverage ranges of broadcasting services for the one or more second information processing apparatuses according to the plurality of broadcasting services, the one or more respective sets of broadcasting services, and
distribute a content stream from a requested broadcasting service to one of the one or more client devices via the network in response to a request from the one or more client devices in a case that the requested broadcasting service is included in the first service coverage range, and
one of the one or more second information processing apparatuses includes second processing circuitry configured to:
distribute the content stream from the requested broadcasting service to the one of the one or more client devices via the network in response to the request from the one or more client devices in a case that the requested broadcasting service is included in a corresponding one of the second coverage ranges determined by the master proxy device.

* * * * *